United States Patent
Kosaki et al.

(10) Patent No.: US 9,627,721 B2
(45) Date of Patent: *Apr. 18, 2017

(54) ELECTRICITY STORAGE DEVICE AND VEHICLE

(75) Inventors: Akihiro Kosaki, Aichi-ken (JP); Shigeru Fukuda, Nagoya (JP); Shigeto Ozaki, Obu (JP); Yasutoshi Mizuno, Toyokawa (JP); Toshiyuki Hara, Toyota (JP); Takanori Kumagai, Toyota (JP); Kenji Iida, Nagoya (JP); Isao Nakagawa, Toyota (JP); Makoto Kobayashi, Okazaki (JP); Shigeyuki Ogasawara, Makinohara (JP); Shinsuke Azuma, Kosai (JP); Yoshiaki Fujiwara, Kosai (JP)

(73) Assignees: TOYOTA JIDOSHA KABUSHIKI KAISHA, Aichi-ken (JP); YAZAKI CORPORATION, Tokyo (JP)

( * ) Notice: Subject to any disclaimer, the term of this patent is extended or adjusted under 35 U.S.C. 154(b) by 449 days.

This patent is subject to a terminal disclaimer.

(21) Appl. No.: 13/818,887

(22) PCT Filed: Aug. 30, 2011

(86) PCT No.: PCT/IB2011/001984
§ 371 (c)(1),
(2), (4) Date: Jun. 4, 2013

(87) PCT Pub. No.: WO2012/028927
PCT Pub. Date: Mar. 8, 2012

(65) Prior Publication Data
US 2013/0241493 A1    Sep. 19, 2013

(30) Foreign Application Priority Data

Aug. 31, 2010 (JP) ................................. 2010-194529

(51) Int. Cl.
*H02J 7/00* (2006.01)
*H01M 10/613* (2014.01)
(Continued)

(52) U.S. Cl.
CPC ........... *H01M 10/5004* (2013.01); *B60K 1/04* (2013.01); *H01M 2/1077* (2013.01);
(Continued)

(58) Field of Classification Search
CPC .... H02J 7/042; H02J 7/0068; H01M 10/5059; H01M 10/5004; H01M 10/613;
(Continued)

(56) References Cited

U.S. PATENT DOCUMENTS 1,964,564 A    6/1934  Ellis
5,490,572 A    2/1996  Tajiri et al.
(Continued)

FOREIGN PATENT DOCUMENTS

EP    0663701 A1    7/1995
JP    5-169981 A    7/1993
(Continued)

OTHER PUBLICATIONS

The English translation of the Office Action dated Mar. 31, 2014, issued by the Korean Intellectual Property Office in corresponding Korean Application No. Oct. 2013-7004847.
(Continued)

*Primary Examiner* — Nathaniel Pelton
(74) *Attorney, Agent, or Firm* — Sughrue Mion, PLLC

(57) ABSTRACT

An electricity storage device includes: a first battery stack (15) including a plurality of cells that are aligned in a first direction; a second battery stack (11 to 14) including a plurality of cells that are aligned in a second direction different from the first direction, the second battery stack being placed under the first battery stack; and a duct for
(Continued)

coolant. The duct is disposed along the first battery stack and is positioned between the first battery stack and the second battery stack.

6 Claims, 15 Drawing Sheets

(51) Int. Cl.
| | |
|---|---|
| *H02J 7/04* | (2006.01) |
| *B60K 1/04* | (2006.01) |
| *H01M 2/10* | (2006.01) |
| *H01M 10/625* | (2014.01) |
| *H01M 10/6563* | (2014.01) |
| *H01M 10/6557* | (2014.01) |
| *B60K 1/00* | (2006.01) |
| *H01M 2/20* | (2006.01) |

(52) U.S. Cl.
CPC ....... *H01M 2/1083* (2013.01); *H01M 10/613* (2015.04); *H01M 10/625* (2015.04); *H01M 10/6557* (2015.04); *H01M 10/6563* (2015.04); *H02J 7/0068* (2013.01); *H02J 7/042* (2013.01); *B60K 2001/005* (2013.01); *B60K 2001/0438* (2013.01); *H01M 2/206* (2013.01)

(58) Field of Classification Search
CPC ........... H01M 10/625; H01M 10/6557; H01M 10/6563; H01M 2/1077; H01M 2/1083; H01M 2/206; B60K 1/04; B60K 2001/005; B60K 2001/0438
USPC ............................ 320/107, 112, 128; 429/72
See application file for complete search history.

(56) References Cited

U.S. PATENT DOCUMENTS

| | | | |
|---|---|---|---|
| 5,639,571 A | 6/1997 | Waters et al. | |
| 5,948,298 A | 9/1999 | Ijaz | |
| 6,040,080 A | 3/2000 | Minami et al. | |
| 6,094,927 A | 8/2000 | Anazawa et al. | |
| 7,353,900 B2 | 4/2008 | Abe et al. | |
| 8,960,350 B2* | 2/2015 | Kosaki ................... | B60K 1/04 180/65.22 |
| 9,077,019 B2* | 7/2015 | Kosaki ................... | H01G 9/155 |
| 2002/0102454 A1 | 8/2002 | Zhou et al. | |
| 2003/0067747 A1 | 4/2003 | Hasegawa et al. | |
| 2004/0232891 A1* | 11/2004 | Kimoto et al. ............... | 320/150 |
| 2007/0015049 A1 | 1/2007 | Hamada et al. | |
| 2007/0141454 A1 | 6/2007 | Marukawa et al. | |
| 2007/0141459 A1 | 6/2007 | Goto et al. | |
| 2007/0175623 A1 | 8/2007 | Park et al. | |
| 2008/0053716 A1 | 3/2008 | Scheucher | |
| 2008/0257624 A1 | 10/2008 | Kubo | |
| 2009/0145676 A1 | 6/2009 | Takasaki et al. | |
| 2009/0183935 A1 | 7/2009 | Tsuchiya | |
| 2009/0197166 A1 | 8/2009 | Horii et al. | |
| 2009/0260905 A1 | 10/2009 | Shinmura | |
| 2010/0059299 A1 | 3/2010 | Hoermandinger et al. | |
| 2010/0071980 A1 | 3/2010 | Kokaji et al. | |
| 2010/0112424 A1 | 5/2010 | Hayashi | |
| 2010/0294580 A1 | 11/2010 | Kubota et al. | |
| 2011/0302773 A1* | 12/2011 | Chattot ........................ | 29/729 |

FOREIGN PATENT DOCUMENTS

| | | |
|---|---|---|
| JP | 6-20716 A | 1/1994 |
| JP | 10-138956 A | 5/1998 |
| JP | 10-149805 A | 6/1998 |
| JP | 2001097048 A | 4/2001 |
| JP | 2001-097048 * | 10/2001 |
| JP | 2004-306726 A | 11/2004 |
| JP | 2005-019231 A | 1/2005 |
| JP | 2006-40644 A | 2/2006 |
| JP | 2006-100156 A | 4/2006 |
| JP | 2007-179872 A | 7/2007 |
| JP | 2007-257901 A | 10/2007 |
| JP | 2008-80930 A | 4/2008 |
| JP | 2008114706 A | 5/2008 |
| JP | 2009-83656 A | 4/2009 |
| JP | 2009-87773 A | 4/2009 |
| JP | 2009-137408 A | 6/2009 |
| JP | 2009-181896 A | 8/2009 |
| JP | 201015788 A | 1/2010 |
| KR | 1019970065032 A | 10/1997 |
| KR | 1020100007431 A | 1/2010 |
| WO | WO 2010/061063 * | 6/2010 |

OTHER PUBLICATIONS

Communication dated Dec. 13, 2013 from the U.S. Patent and Trademark Office issued in corresponding U.S. Appl. No. 13/816,907.

Communication dated May 29, 2014 from the U.S. Patent and Trademark Office issued in corresponding U.S. Appl. No. 13/816,907.

* cited by examiner

ELECTRICITY STORAGE DEVICE AND VEHICLE

BACKGROUND OF THE INVENTION

1. Field of the Invention

The invention relates to an electricity storage device including a plurality of battery stacks, each including a plurality of cells, and to a vehicle including the same.

2. Description of Related Art

A plurality of battery stacks are mounted on a vehicle or the like in some cases. The battery stack is formed by aligning a plurality of unit cells in one direction and outputs energy that is used to drive the vehicle. When a plurality of battery stacks are used, the plurality of battery stacks are aligned in the same plane (see Japanese Patent Application Publications Nos. 2005-019231, 2006-100156, and 2009-181896 (JP-A-2005-019231, JP-A-2006-100156, and JP-A-2009-181896), for example).

When a plurality of battery stacks are used, the plurality of battery stacks are aligned in the vertical direction in some cases. The plurality of battery stacks are arranged so as to intersect each other when viewed from above in some cases. In such a case, the heat generated by the lower battery stack(s) can rise and reach the upper battery stack(s).

When the plurality of battery stacks are arranged so as to intersect each other, the heat from the lower battery stack(s) reaches part of the upper battery stack(s) only. In other words, the upper battery stack(s) include(s) a unit cell that is affected by the heat from the lower battery stack(s) and a unit cell that is not affected by the heat therefrom. In this case, nonuniformity of temperature in the unit cells occur in the direction of alignment of the upper battery stack. When the nonuniformity of temperature in the unit cells occurs, there is a fear that nonuniformity also occurs in the deterioration conditions of the unit cells.

SUMMARY OF THE INVENTION

An electricity storage device according to an aspect of the invention includes: a first battery stack including a plurality of cells that are aligned in a first direction; a second battery stack including a plurality of cells that are aligned in a second direction different from the first direction, the second battery stack being placed under the first battery stack; and a duct for coolant. The duct is disposed along the first battery stack and is positioned between the first battery stack and the second battery stack.

A plurality of the second battery stacks may be provided. The plurality of second battery stacks may be aligned in the first direction. The duct may be connected to each of the second battery stacks and supply coolant to the second battery stacks.

The ducts connected to the second battery stacks may be joined together on an upstream side in terms of a flow path of the coolant. In other words, the duct may be branched and connected to each of the second battery stacks. With this configuration, the duct is simplified as compared to the case where the plurality of ducts are not joined together. The electricity storage device may further include electronic equipment that is used to control charging and discharging of the electricity storage device, the electronic equipment being placed under the plurality of ducts at a position such that the electronic equipment faces the plurality of ducts. The first direction and the second direction may be perpendicular to each other.

A supporting member may be formed of an electrically conductive material and a shielded wire of a wire harness may be connected to the supporting member. With this configuration, the supporting member and a reinforcement frame are made to have a function of the shielded wire and the shielded wire is grounded. In addition, when the supporting member and the reinforcement frame are used, it is possible to shorten the shielded wire. The wire harness is used to charge and discharge the first battery stack and the second battery stack.

The electricity storage device of this invention may be mounted on a vehicle. When the electric power from the electricity storage device is supplied to a motor/generator, the kinetic energy for driving the vehicle is generated. In addition, the motor/generator can convert the kinetic energy generated during regenerative braking of the vehicle into electric energy and the electricity storage device can store this electric energy.

According to this invention, a duct is placed between a first battery stack and a second battery stack, so that it is possible to prevent the heat generated by the second battery stack from reaching the first battery stack. Thus, it is possible to inhibit the first battery stack from being partially heated by the heat generated by the second battery stack.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

An embodiment of the invention will be described below.

Figure 1:
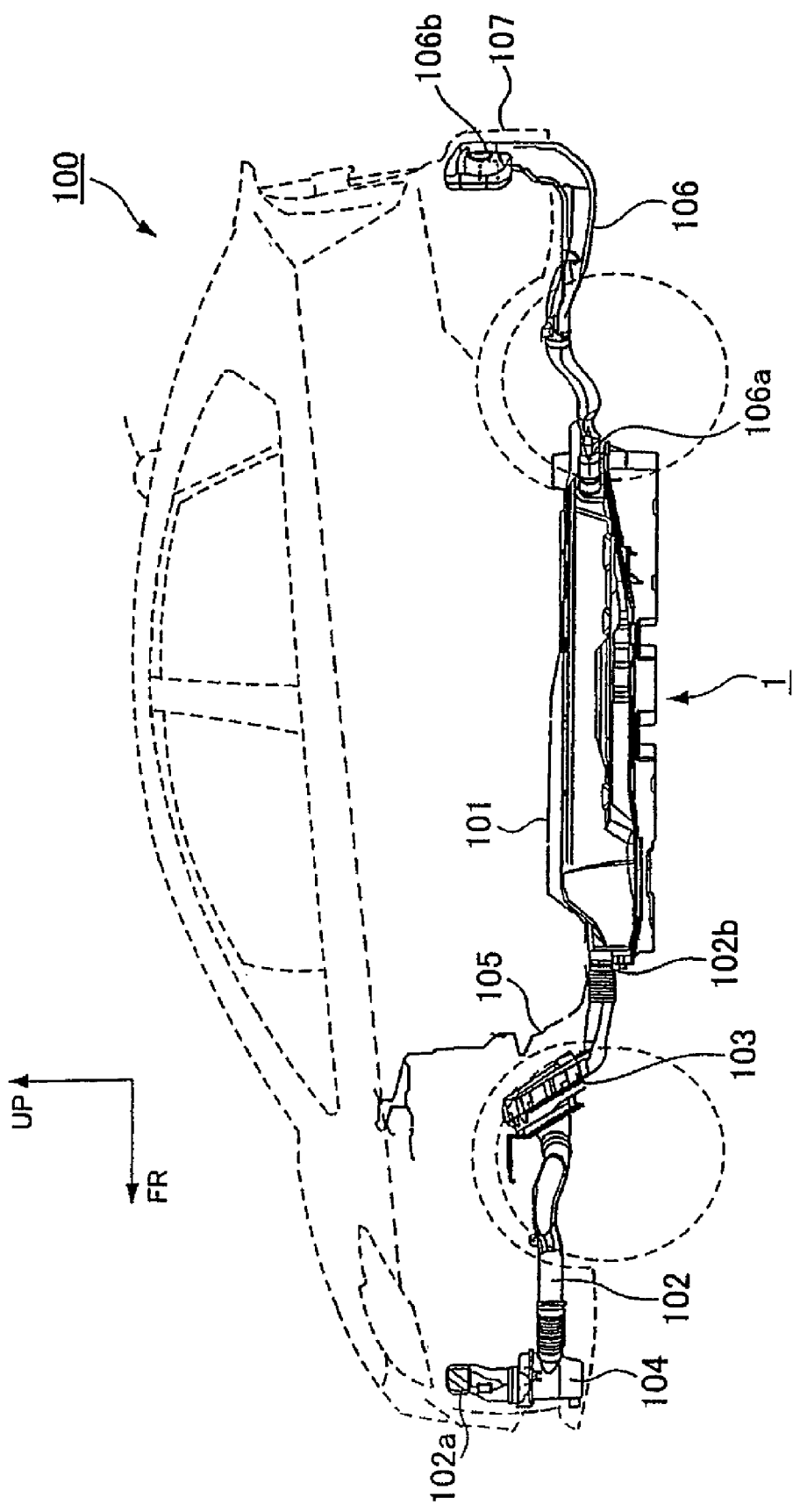
FIG. 1 is a side view of a vehicle equipped with a battery unit.

A battery unit, serving as an electricity storage device, that is an embodiment of the invention will be described. A vehicle equipped with the battery unit of this embodiment will be described with reference to FIG. 1. FIG. 1 is a side view of the vehicle, mainly showing the battery unit and a mechanism for regulating the temperature of the battery unit. In FIG. 1, the arrow UP means the upward direction with respect to the vehicle and the arrow FR means the forward direction with respect to the vehicle.

The vehicle 100 of this embodiment includes a floor panel 101, on the underside of which the battery unit 1 is installed. The upper side of the floor panel 101 forms part of the cabin and therefore, the battery unit 1 is positioned outside the cabin. The cabin is a space for an occupant or occupants. The floor panel 101 is part of the body of the vehicle 100.

Examples of the vehicle 100, on which the battery unit 1 is mounted, include hybrid vehicles and pure electric vehicles. The hybrid vehicle is a vehicle equipped with an internal combustion engine or a fuel cell in addition to the battery unit 1 as the motive power source for driving the vehicle 100. The pure electric vehicle is a vehicle equipped with the battery unit 1 alone as the motive power source of the vehicle 100.

The battery unit 1 is connected to a motor/generator (not shown), which receives the output from the battery unit 1 to generate the kinetic energy for driving the vehicle 100. The torque output from the motor/generator is transmitted to wheels via a power transmission mechanism.

A step-up circuit and an inverter may be placed between the battery unit 1 and the motor/generator. When the step-up circuit is placed, it is possible to step up, or boost, the output voltage of the battery unit 1. When the inverter is used, it is possible to convert the direct-current (DC) power output from the battery unit 1 to the alternating-current (AC) power, so that it is possible to use a three phase AC motor as the motor/generator. The motor/generator converts the kinetic energy produced during braking of the vehicle 100 into electric energy and outputs the electric energy to the battery unit 1. The battery unit 1 stores the electric power supplied from the motor/generator.

An intake duct 102 is connected to the battery unit 1 and is disposed in front of the battery unit 1 in the vehicle 100. An intake port 102a is provided at one end of the intake duct 102 and air is taken in through the intake port 102a. The other end 102b of the intake duct 102 is connected to the battery unit 1.

A blower 103 is provided for the intake duct 102 and air is moved from the intake port 102a of the intake duct 102 toward the battery unit 1 by driving the blower 103. Although the blower 103 is provided for the intake duct 102 in this embodiment, the invention is not limited to this. It suffices that air flows from the intake port 102a of the intake duct 102 toward the battery unit 1. For example, the blower 103 may be provided for an exhaust duct 106 to be described later.

An air cleaner 104 is provided for the intake duct 102 and cleans the air taken in through the intake port 102a of the intake duct 102. Specifically, the air cleaner 104 removes the foreign matter contained in the air with the use of a filter. The blower 103 and the air cleaner 104 are disposed in the space provided in front of a dashboard 105 in the vehicle 100. This space corresponds to the engine compartment when the vehicle 100 is an automobile equipped with an engine.

The air introduced from the intake duct 102 into the battery unit 1 passes through the inside of the battery unit 1 and enters the exhaust duct 106. The air passes through the inside of the battery unit 1, so that it is possible to regulate the temperature of the battery unit 1. For example, air takes heat away from the battery unit 1, so that the battery unit 1 is cooled. The flow of air in the battery unit 1 will be described later.

One end 106a of the exhaust duct 106 is connected to the battery unit 1. An exhaust port 106b is formed at the other end of the exhaust duct 106. The other end of the exhaust duct 106 is positioned inside a rear bumper case 107. The air discharged through the exhaust port 106b moves into a space created in the rear bumper case 107.

Figure 2:
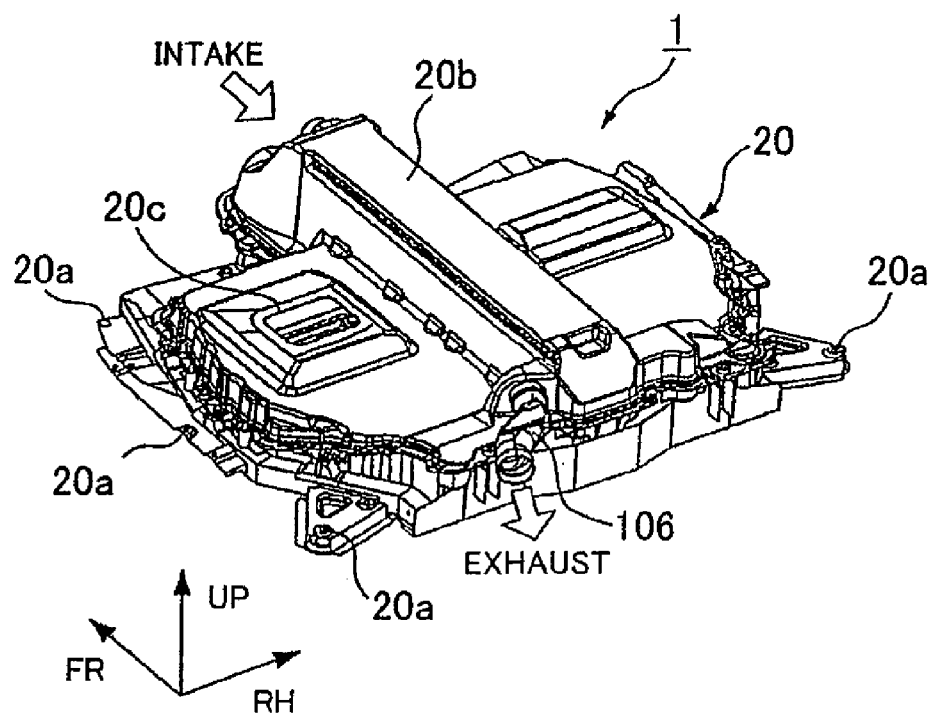
FIG. 2 is an external view of the battery unit.
Figure 3:
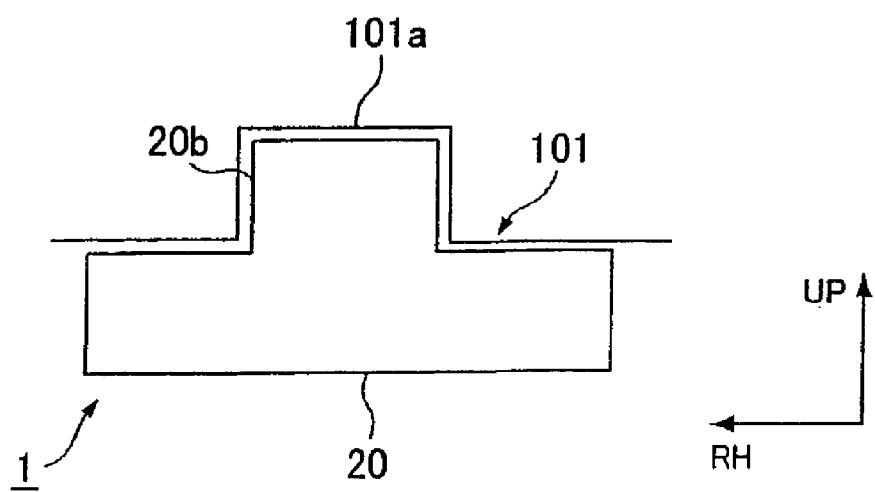
FIG. 3 is a schematic view of the battery unit and a floor panel when viewed from the front of the vehicle.
Figure 4:
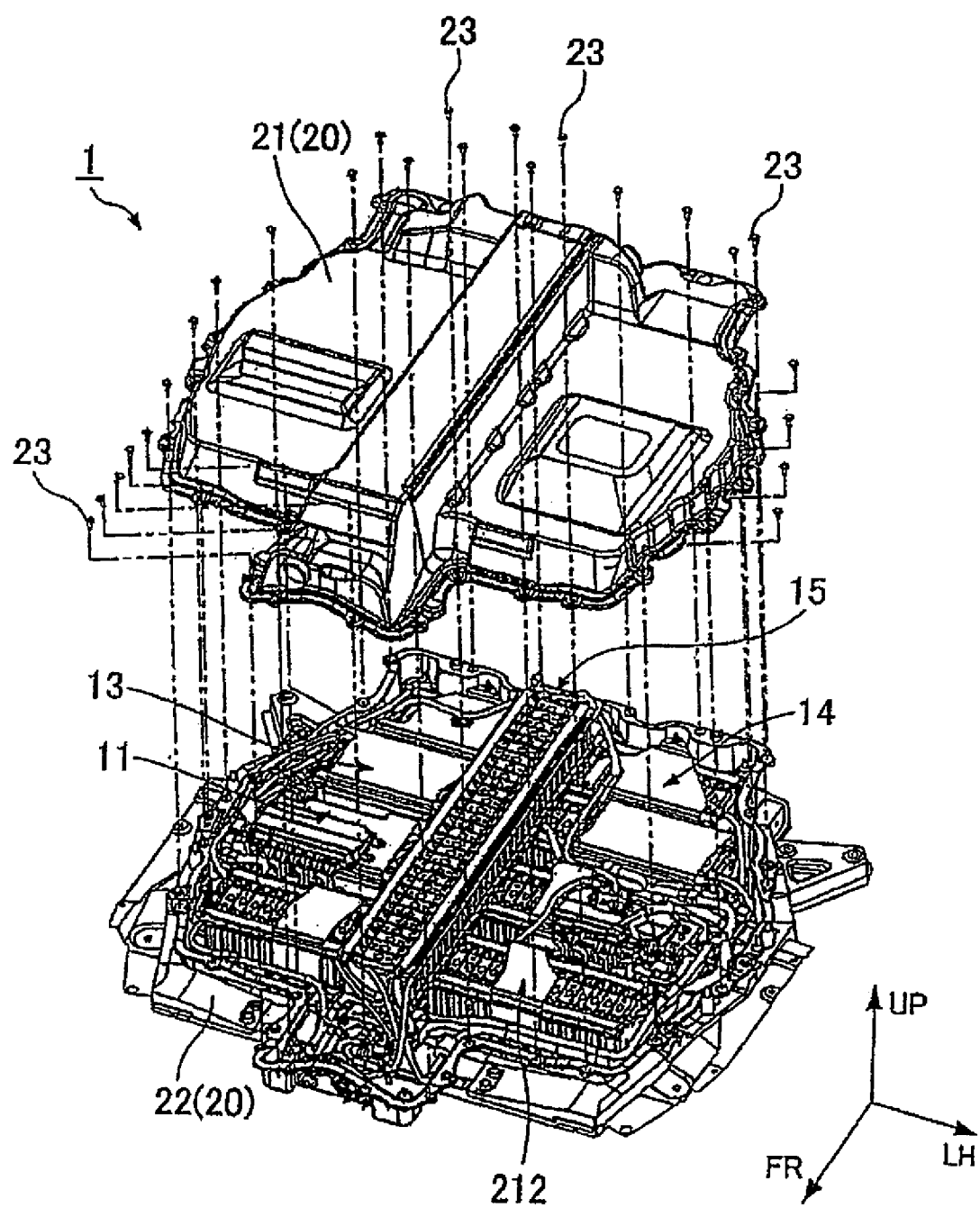
FIG. 4 is an exploded view of the battery unit.

Next, a configuration of the battery unit 1 will be described. FIG. 2 is an external view of the battery unit 1. FIG. 3 is a schematic view of the battery unit 1 and the floor panel 101 when viewed from the front of the vehicle 100. FIG. 4 is an exploded view of the battery unit 1. In FIG. 2, the arrow RH means the right when one faces the forward direction FR of the vehicle 100. In FIG. 4, the arrow LH means the left when one faces the forward direction of the vehicle 100.

The battery unit 1 includes five battery stacks 11 to 15, each of which serves as a battery stack, and a pack case 20 that accommodates the battery stacks 11 to 15. A plurality of fastening portions 20a axe provided at the periphery of the pack case 20 and are used to fix the battery unit 1 to the floor panel 101.

A protruding portion 20b is formed on the upper side of the pack case 20. The protruding portion 20b protrudes upward and extends in the longitudinal direction of the vehicle 100. As shown in FIG. 3, the upper side of the pack case 20 is placed along the floor panel 101. The floor panel 101 has a center tunnel 101a.

The center tunnel 101a protrudes upward and extends in the longitudinal direction of the vehicle 100. The center tunnel 101a is provided between the driver's seat and the passenger seat in the lateral direction of the vehicle 100. The protruding portion 20b of the pack case 20 is positioned in the center tunnel 101a. An opening 20c, which is provided to pass a circuit breaker to be described later therethrough, is formed in the upper side of the pack case 20.

As shown in FIG. 4, the battery unit 1 has five battery stacks 11 to 15, which are covered by an upper case 21 and a lower case 22. The upper case 21 is fixed to the lower case 22 via a plurality of bolts 23. The upper case 21 may be formed of a resin containing glass fibers, for example.

The battery stacks 11 to 14 extend in the lateral direction of the vehicle 100 and the four battery stacks 11 to 14 are aligned in the longitudinal direction of the vehicle 100. The battery stack 15, which serves as a first battery stack, is positioned above the four battery stacks 11 to 14, each of which serves as a second battery stack, and the battery stack 15 extends in the longitudinal direction of the vehicle 100. The battery stack 15 is placed at a position corresponding to the protruding portion 20b of the pack case 20. Specifically, the battery stack 15 is positioned in the center tunnel 101a.

Figure 5:
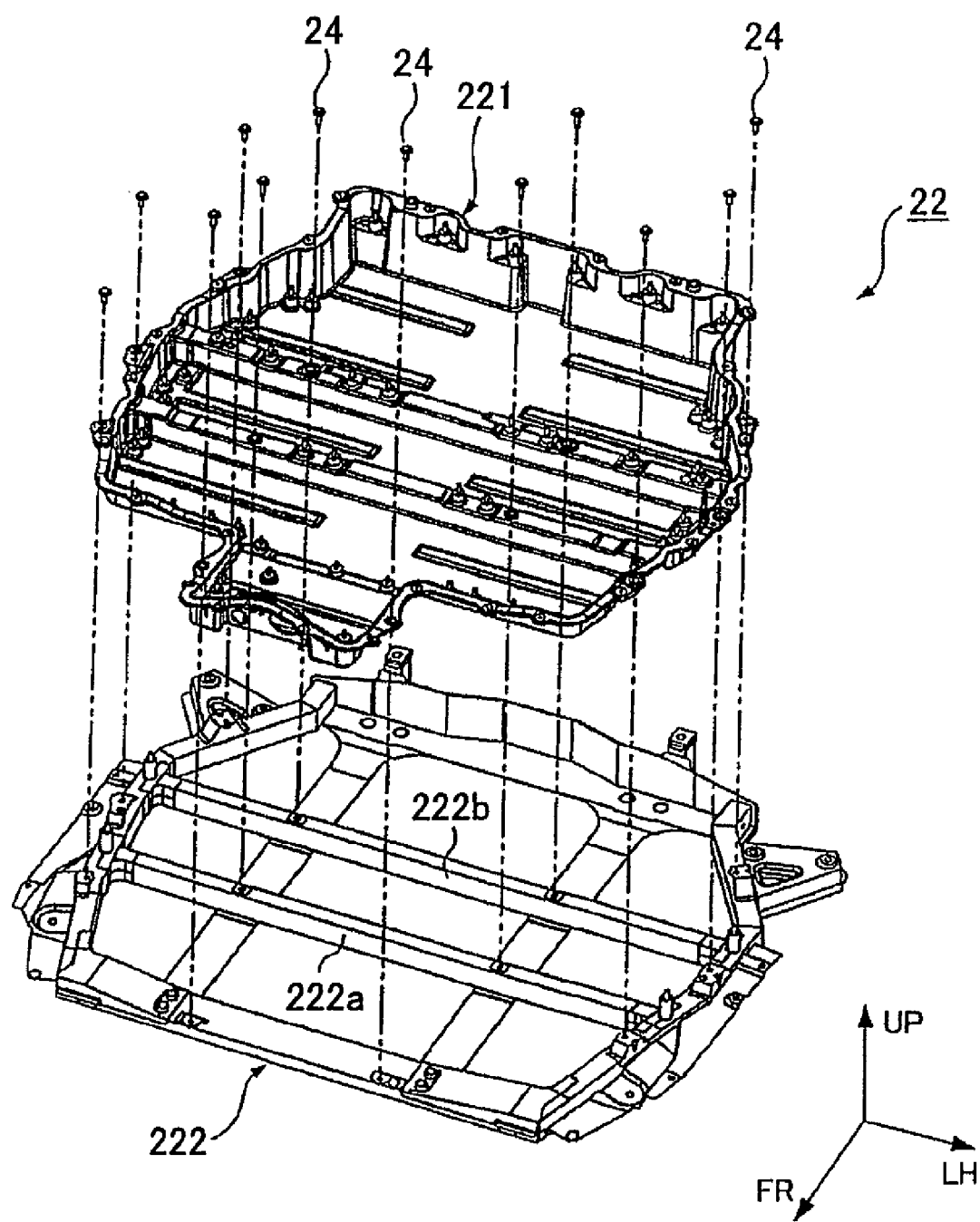
FIG. 5 is an exploded view of a lower case.

The lower case 22 has a lower carrier 221 and a frame 222, which serves as a reinforcement frame, as shown in FIG. 5. The battery stacks 11 to 15 are fixed to the lower carrier 221. The lower carrier 221 is fixed to the frame 222 via a plurality of bolts 24. The lower carrier 221 may be formed of a resin containing glass fibers, for example. The frame 222 may be formed of metal, such as iron. The frame 222 is used to secure the strength of the lower case 22 and has reinforcements 222a and 222b that extend in the lateral direction of the vehicle 100. The frame 222 is fixed to the floor panel 101.

Figure 6:
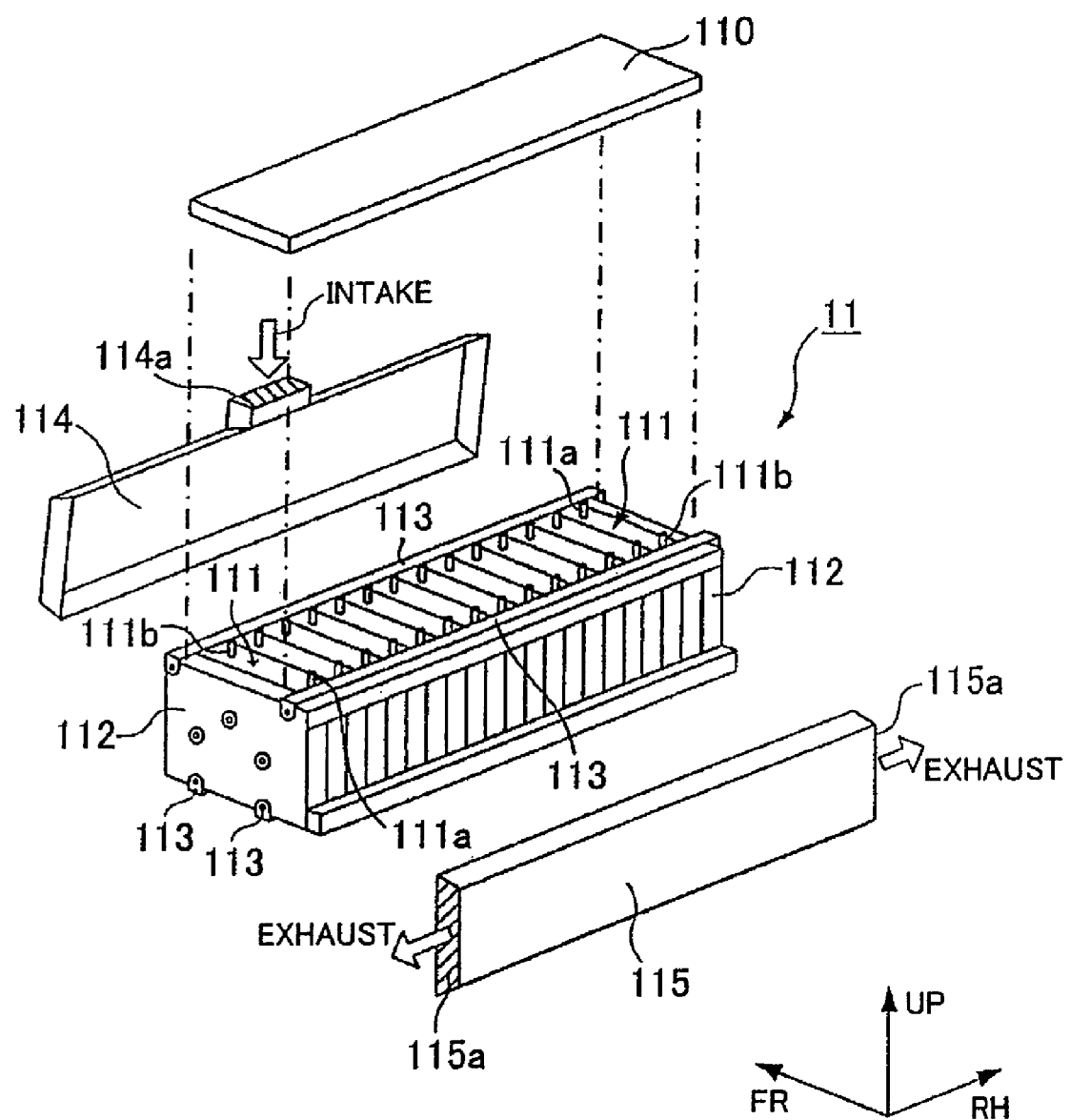
FIG. 6 is an exploded view of a battery stack.

Next, the configuration of each of the battery stacks 11 to 15 will be described. FIG. 6 is an exploded view of the battery stack 11. The battery stack 11 has a plurality of unit cells 111, each of which serves as a cell, that are aligned in one direction. A rectangular unit cell is used as the unit cell 111. In this embodiment, the number of unit cells constituting each of the battery stacks 11 to 15 differs from each other. The number of unit cells constituting each of the battery stacks 11 to 15 may be suitably set. In this embodiment, the number of unit cells constituting each of the battery stacks 11 to 15 is set according to the shape of the lower case 22. In addition, a separator plate is placed between two adjacent unit cells 111. The separator plate is formed of an electrically insulating material, such as a resin, and is used to create a space on each of the surfaces of the unit cells 111.

A secondary battery, such as a nickel-hydrogen battery or a lithium-ion battery, may be used as the unit cell 111. Instead of the secondary battery, an electric double layer capacitor (capacitor) may be used. While a plurality of unit cells are aligned in one direction in each of the battery stacks 11 to 15 of this embodiment, the invention is not limited to this. Specifically, a configuration may be employed, in which a plurality of unit cells are used to form a battery module and a plurality of the battery modules are aligned in one direction.

An electricity generating element is housed in the unit cell 111. The electricity generating element is an element that can perform charging and discharging. The electricity generating element may include a cathode element, an anode element, and a separator including the electrolytic solution placed between the cathode element and the anode element, for example. The cathode element is obtained by forming a cathode active material layer on the surface of a current collector. The anode element is obtained by forming an anode active material on the surface of a current collector.

A cathode terminal 111a and an anode terminal 111b are provided on the upper side of the unit cell 111. The cathode terminal 111a is electrically connected to the cathode element of the electricity generating element. The anode terminal 111b is electrically connected to the anode element of the electricity generating element. Two adjacent unit cells 111 are electrically connected to each other via a bus bar.

In this embodiment, a bus bar module 110, into which a plurality of bus bars are integrated, is used. The bus bar module 110 is placed on the upper side of the battery stack 11. The bus bar module 110 has a plurality of bus bars and a holder that holds the bus bars. The holder is formed of an electrically insulating material, such as a resin. Each bus bar may be covered by an electrically insulating cover, such as a resin cover, and the cover may be attached to the holder.

A pair of end plates 112 are placed at two ends of the battery stack 11. A restraining band 113 extends in the direction of alignment of the plurality of unit cells 111 and two end portions of the restraining band 113 are fixed to the pair of end plates 112. Two of the restraining bands 113 are placed on the upper side of the battery stack 11 and two of the restraining bands 113 are placed on the lower side of the battery stack 11.

When the restraining band 113 is fixed to the end plates 112, the pair of end plates 112 are displaced in the directions such that the pair of end plates 112 are brought closer to each other. In this way, a restraining force is exerted on the plurality of unit cells 111 that are sandwiched between the pair of end plates 112. A spacer is placed between two adjacent unit cells 111 and air can enter between the two adjacent unit cells 111.

An intake chamber 114 and an exhaust chamber 115 are disposed at two sides of the battery stack 11. Specifically, the intake chamber 114 and the exhaust chamber 115 are disposed at positions such that the intake chamber 114 and the exhaust chamber 115 sandwich the plurality of unit cells 111 in the direction perpendicular to the direction of alignment of the plurality of unit cells 111. The intake chamber 114 has a connection port 114a, through which air from the intake duct 102 enters. The air that moves into the intake chamber 114 enters the space created between two adjacent unit cells 111. Air moves from the intake chamber 114 toward the exhaust chamber 115.

Heat is exchanged between air and the unit cells 111, so that it is possible to regulate the temperature of the unit cells 111. When the unit cells 111 are charged or discharging and are therefore generating heat, air takes heat away from the unit cells 111, so that it is possible to suppress the increase in temperature of the unit cells 111. The air that has passed through the space between two unit cells 111 moves into the exhaust chamber 115. Exhaust ports 115a are provided at two ends of the exhaust chamber 115 and air after heat exchange is discharged through the exhaust ports 115a. The air discharged through the exhaust ports 115a moves into the space created between the upper case 21 and the lower case 22.

The configuration of the battery stacks 12 to 15 is basically similar to that of the battery stack 11. The number of unit cells constituting each of the battery stacks 11 to 15 differs from each other. The plurality of unit cells constituting each of the battery stacks 11 to 14 are aligned in the lateral direction of the vehicle 100 and the plurality of unit cells constituting the battery stack 15 are aligned in the longitudinal direction of the vehicle 100.

Figure 7:
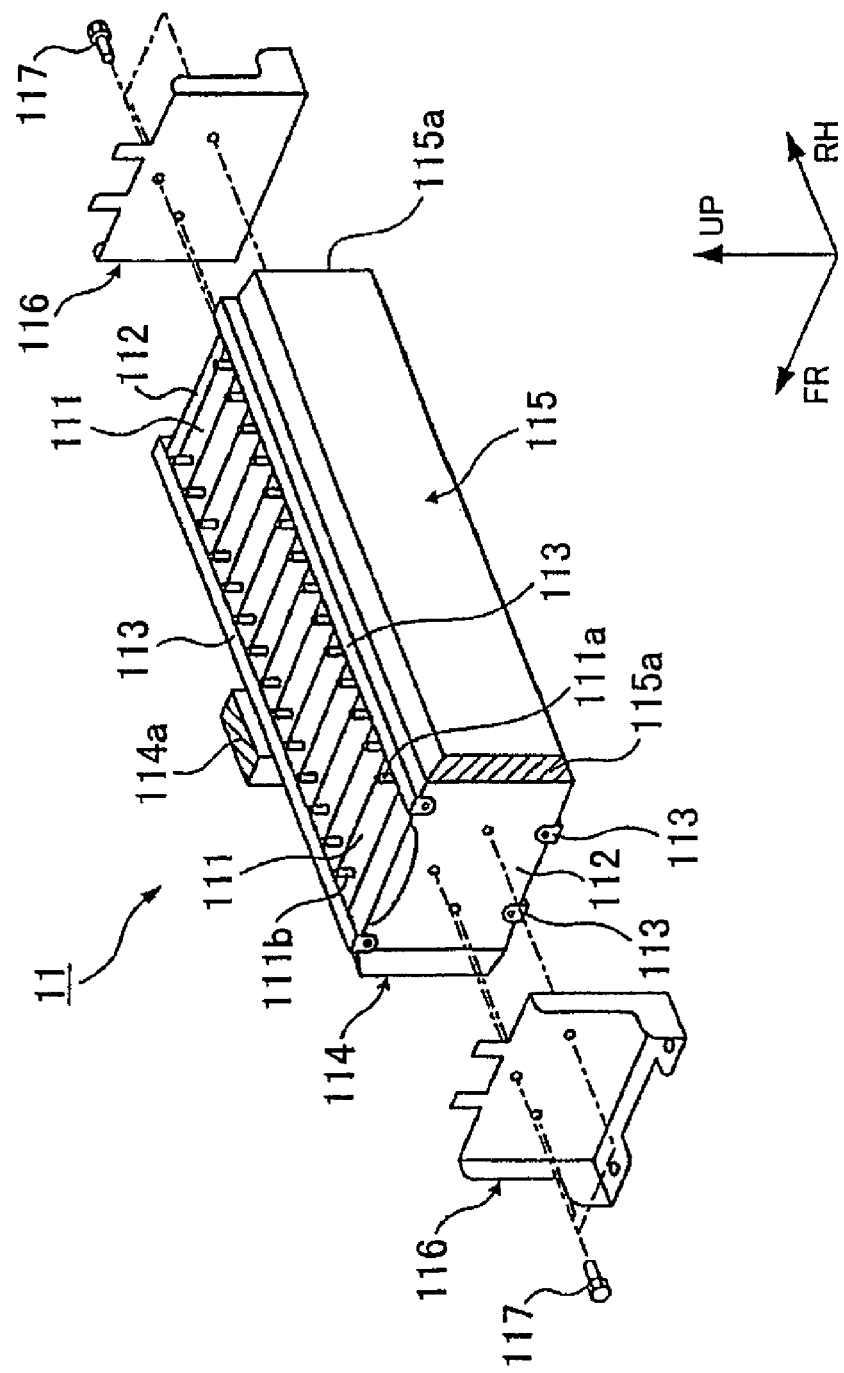
FIG. 7 is an external view of a fixation structure of the battery stack.
Figure 8:
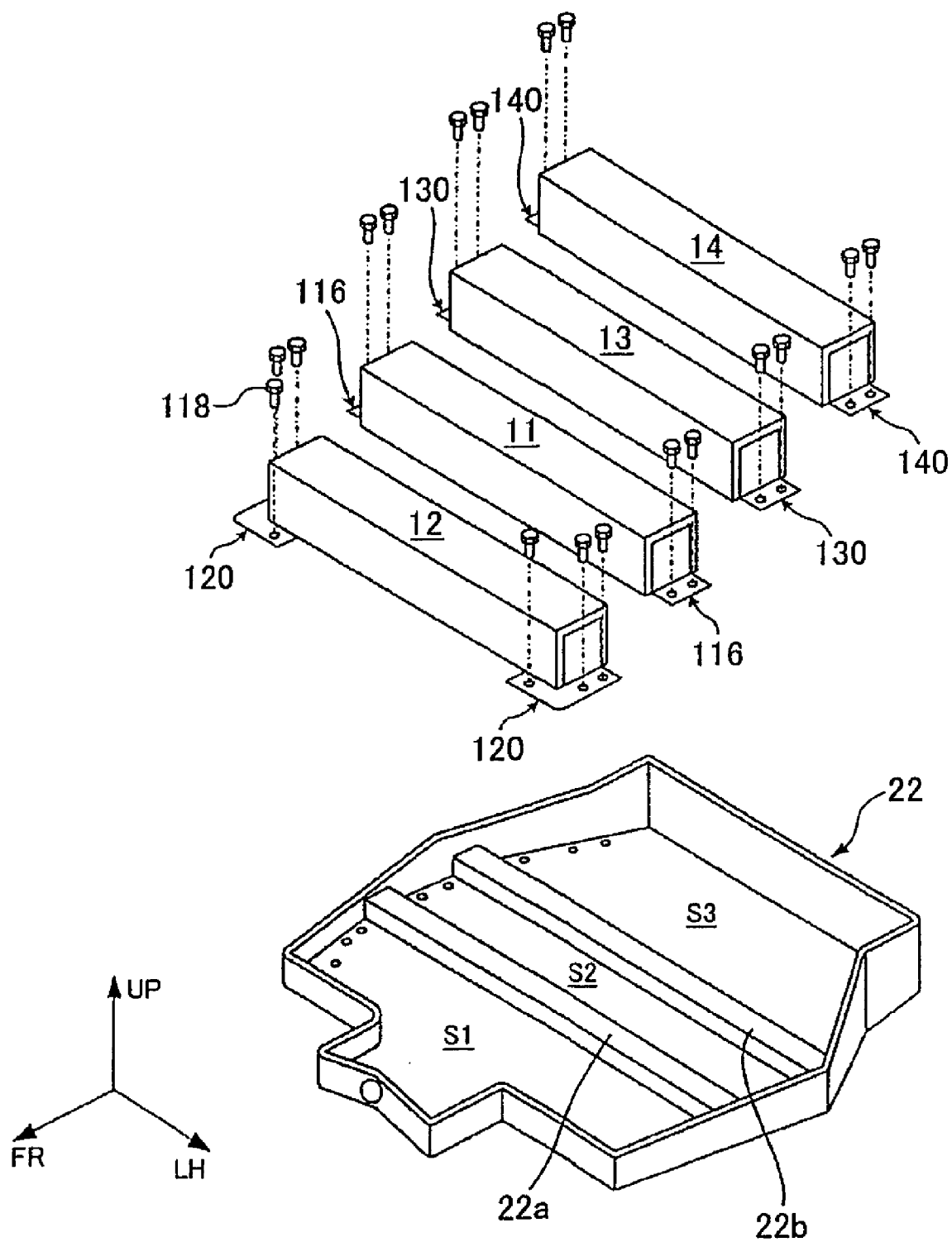
FIG. 8 is an external view of an internal structure of the battery unit.

As shown in FIG. 7, a bracket 116 is fixed to the end plates 112 of the battery stack 11 via bolts 117. As shown in FIG. 8, the bracket 116 is fixed to the lower case 22 via bolts 118. In this way, the battery stack 11 is fixed to the lower case 22.

A bracket 120 is used to fix the battery stack 12 to the lower case 22. Specifically, the bracket 120 is fixed to the pair of end plates of the battery stack 12 and to the lower case 22. A bracket 130 is used to fix the battery stack 13 to the lower case 22. Specifically, the bracket 130 is fixed to the pair of end plates of the battery stack 13 and to the lower case 22. A bracket 140 is used to fix the battery stack 14 to the lower case 22. Specifically, the bracket 140 is fixed to the pair of end plates of the battery stack 14 and to the lower case 22.

The lower case 22 has two ribs 22a and 22b. The ribs 22a and 22b protrude upward and extend in the lateral direction of the vehicle 100. Part of the frame 222 (see FIG. 5) forms the ribs 22a and 22b. The battery stack 12 is mounted in a first region S1 positioned further forward than the rib 22a with respect to the vehicle 100. The battery stack 11 is mounted in a second region S2 positioned between the rib 22a and the rib 22b. The battery stacks 13 and 14 are mounted in a third region S3 positioned further rearward than the rib 22b with respect to the vehicle 100. The battery stacks 11 to 14 are fixed not only to the brackets 116, 120, 130, and 140 but also to the lower case 22 with the use of the brackets 30 (see FIG. 12).

Figure 9:
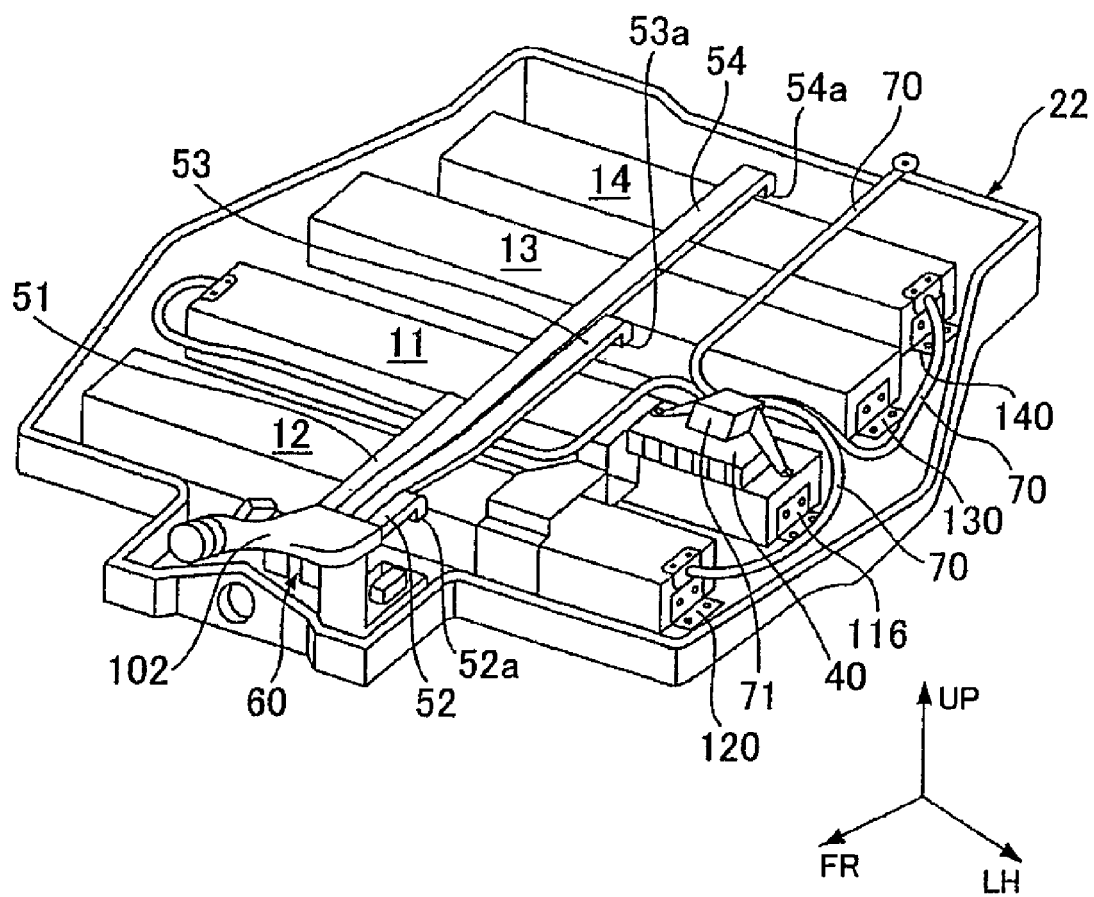
FIG. 9 is an external view for explaining the internal structure of the battery unit.
Figure 10:
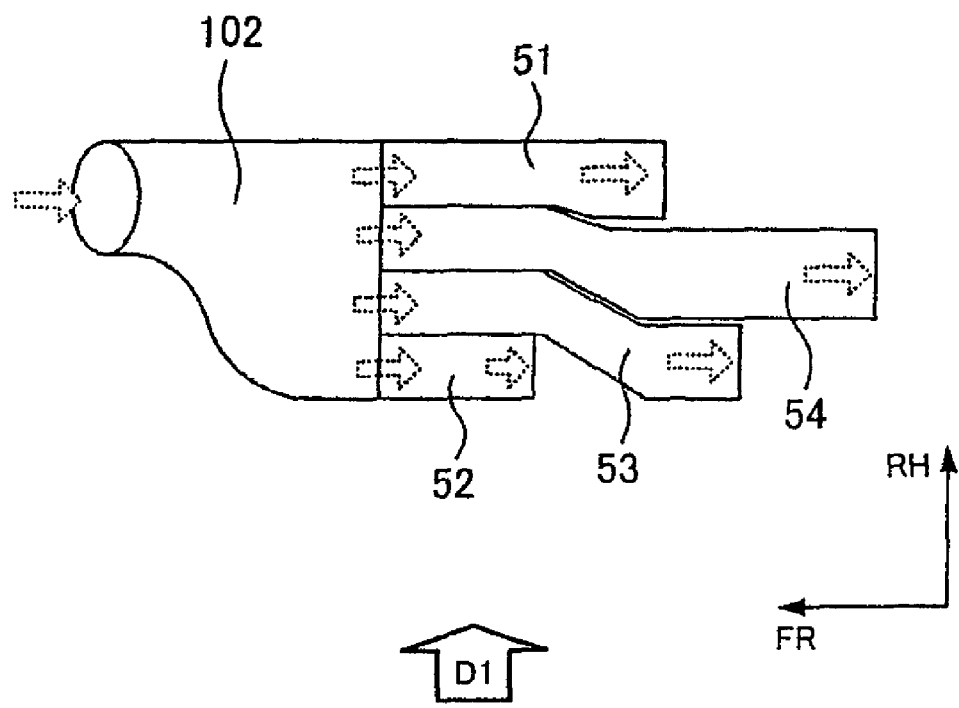
FIG. 10 is a plan view of an intake duct and branch ducts.
Figure 11:
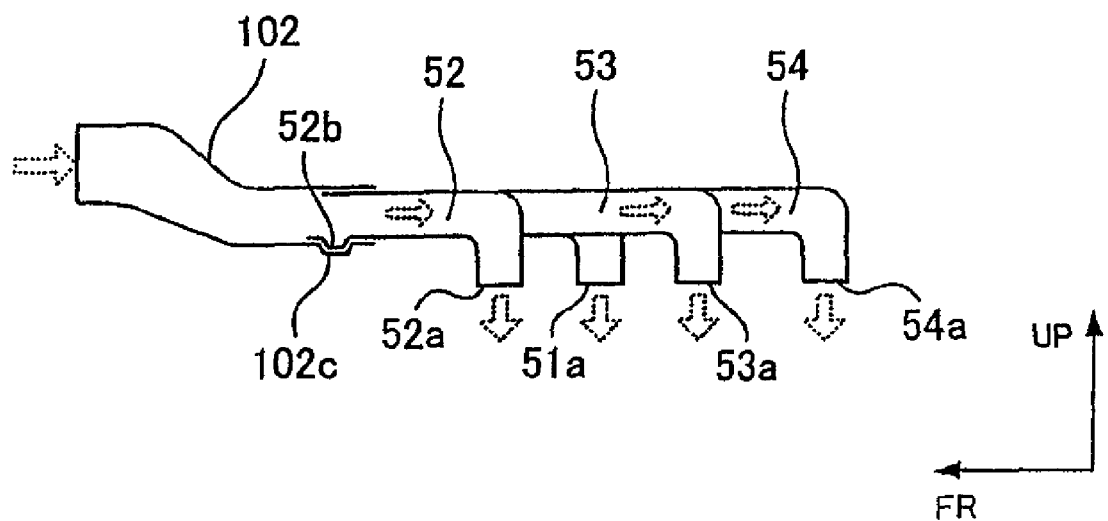
FIG. 11 is a side view of the intake duct and the branch ducts.

As shown in FIGS. 9 and 10, four branch ducts 51 to 54 are connected to 26 the intake duct 102. FIG. 9 is a diagram showing the arrangement of the branch ducts 51 to 54 and FIG. 10 is a plan view of the branch ducts 51 to 54. As shown in FIG. 11, the branch duct 52 has a projection 52*b* and the intake duct 102 has a concave portion 102*c* that engages with the projection 52*b*. The projection 52*b* and the concave portion 102*c* engage with each other, so that the branch duct 52 is fixed to the intake duct 102. FIG. 11 is a diagram when viewed along the direction of the arrow D1 in FIG. 10.

The branch ducts 51, 53, and 54 also have projections corresponding to the projection 52*b* of the branch duct 52, and the projections engage with the concave portions 102*c* of the intake duct 102. In this way, the branch ducts 51, 53, and 54 are connected to the intake duct 102. The air from the intake duct 102 moves into the four branch ducts 51 to 54. The arrows drawn by dotted lines in FIGS. 10 and 11 indicate the directions of movement of the air.

A connection port 51*a* of the branch duct 51 is connected to a connection port 114*a* of the intake chamber 114 provided for the battery stack 11. The branch duct 51 is connected on the front side of the battery stack 11 with respect to the vehicle 100. The air in the branch duct 51 is supplied to the unit cell 111 of the battery stack 11. A connection port 52*a* of the branch duct 52 is connected to the intake chamber provided for the battery stack 12 and the air in the branch duct 52 is supplied to the unit cell of the battery stack 12. The branch duct 52 is connected on the front side of the battery stack 12 with respect to the vehicle 100.

A connection port 53*a* of the branch duct 53 is connected to the intake chamber provided for the battery stack 13 and the air in the branch duct 53 is supplied to the unit cell of the battery stack 13. The branch duct 53 is connected on the front side of the battery stack 13 with respect to the vehicle 100. A connection port 54*a* of the branch duct 54 is connected to the intake chamber provided for the battery stack 14 and the air in the branch duct 54 is supplied to the unit cell of the battery stack 14. The branch duct 54 is connected on the rear side of the battery stack 14 with respect to the vehicle 100.

As shown in FIG. 9, electronic equipment 60 is placed under the intake duct 102. The electronic equipment 60 is fixed to the lower case 22. The electronic equipment 60 is used to control charging and discharging of the battery stacks 11 to 15. System main relays and a resistor are examples of the electronic equipment 60. The system main relays allow and inhibit the charging and discharging of the battery stacks 11 to 15. The system main relays and the resistor are attached to a junction box.

Figure 12:
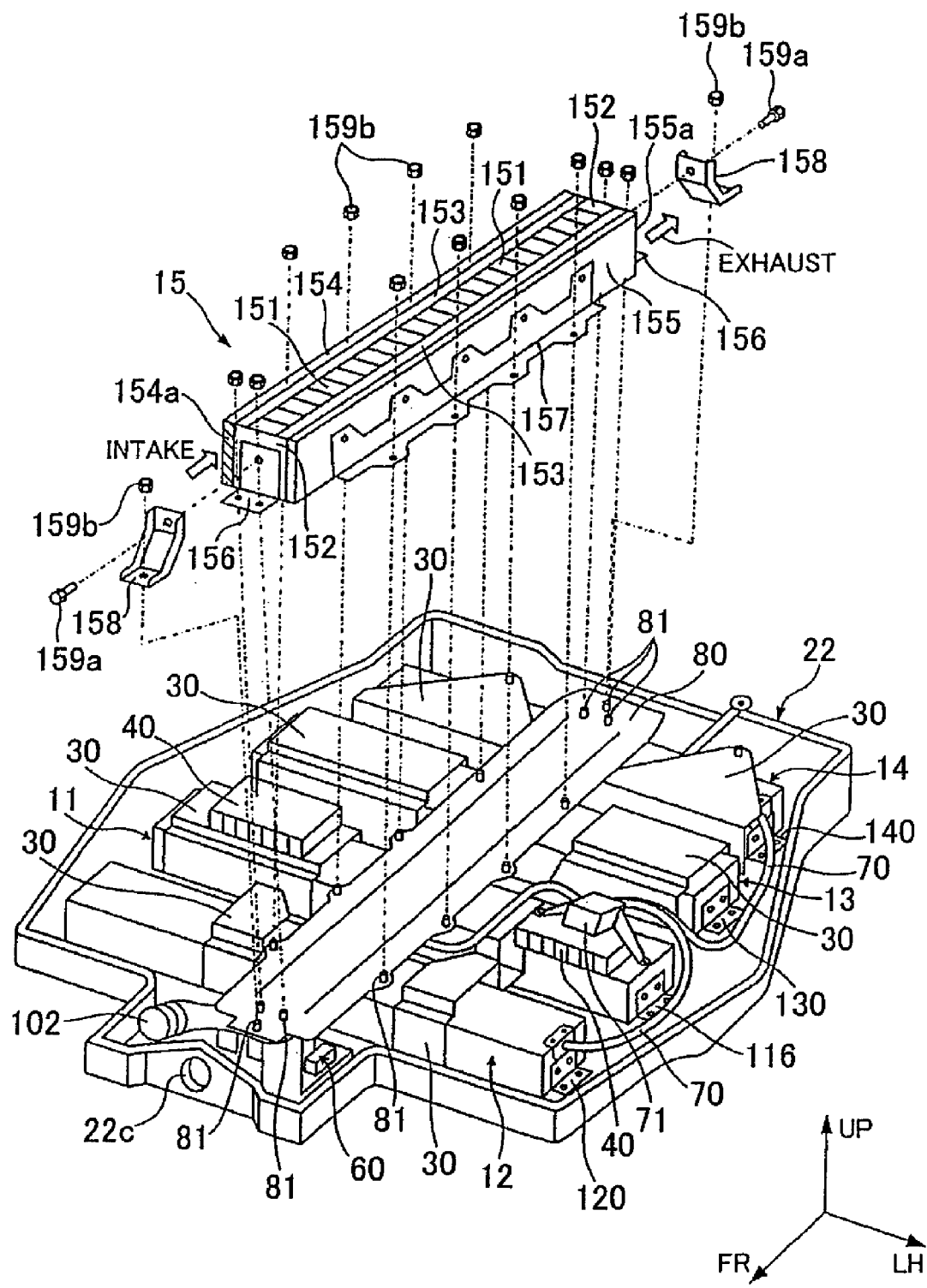
FIG. 12 is an external view for explaining the internal structure of the battery unit.

As shown in FIG. 12, a base 80, which serves as part of a supporting member, is placed over the branch ducts 51 to 54. The base 80 is also present over part of the intake duct 102. The base 80 and the branch ducts 51 to 54 overlap each other when viewed from above. The base 80 has a leg (not shown) extending downward and the tip of the leg is fixed to the lower case 22. With this leg, it is possible to position the base 80 over the branch ducts 51 to 54. Although the base 80 is fixed using the leg in this embodiment, the invention is not limited to this. For example, a bracket may be placed between two adjacent battery stacks (11 to 14) and the base may be fixed to the bracket.

A plurality of stud bolts 81 are provided on the upper side of the base 80 and each of the stud bolts 81 is threaded. The battery stack 15 is placed on the upper side of the base 80. The battery stack 15 has a plurality of unit cells 151, which are aligned in one direction (longitudinal direction of the vehicle 100).

A pair of end plates 152 are placed at two ends of the battery stack 15. A restraining band 153 extends in the longitudinal direction of the vehicle 100 and two end portions of the restraining band 153 are fixed to the pair of end plates 152. Two of the restraining bands 153 are placed on the upper side of the battery stack 15 and two of the restraining bands 153 are placed on the lower side of the battery stack 15. With the use of the restraining bands 153 and the end plates 152, a restraining force is exerted on the plurality of unit cells 151.

Two brackets 156 and 158 are fixed to the end plates 152 via bolts 159*a*. The stud bolts 81 of the base 80 are passed through the brackets 156 and 158 and engage with the nuts 159*b*.

An intake chamber 154 and an exhaust chamber 155 are disposed at two sides of the battery stack 15. The intake chamber 154 extends in the direction of alignment of the plurality of unit cells 151 and one end of the intake chamber 154 is provided with a connection port 154*a*. The other end of the intake chamber 154 is closed. The exhaust chamber 155 extends in the direction of alignment of the plurality of unit cells 151 and one end of the exhaust chamber 155 is provided with an exhaust port 155*a*. The other end of the exhaust chamber 155 is closed. The connection port 154*a* is provided at one end of the battery stack 15 in the longitudinal direction of the vehicle 100 and the exhaust port 155*a* is provided at the other end of the battery stack 15 in the longitudinal direction of the vehicle 100. The connection port 154*a* is connected to the intake duct 102 and the air from the intake duct 102 enters the intake chamber 154.

Figure 13:
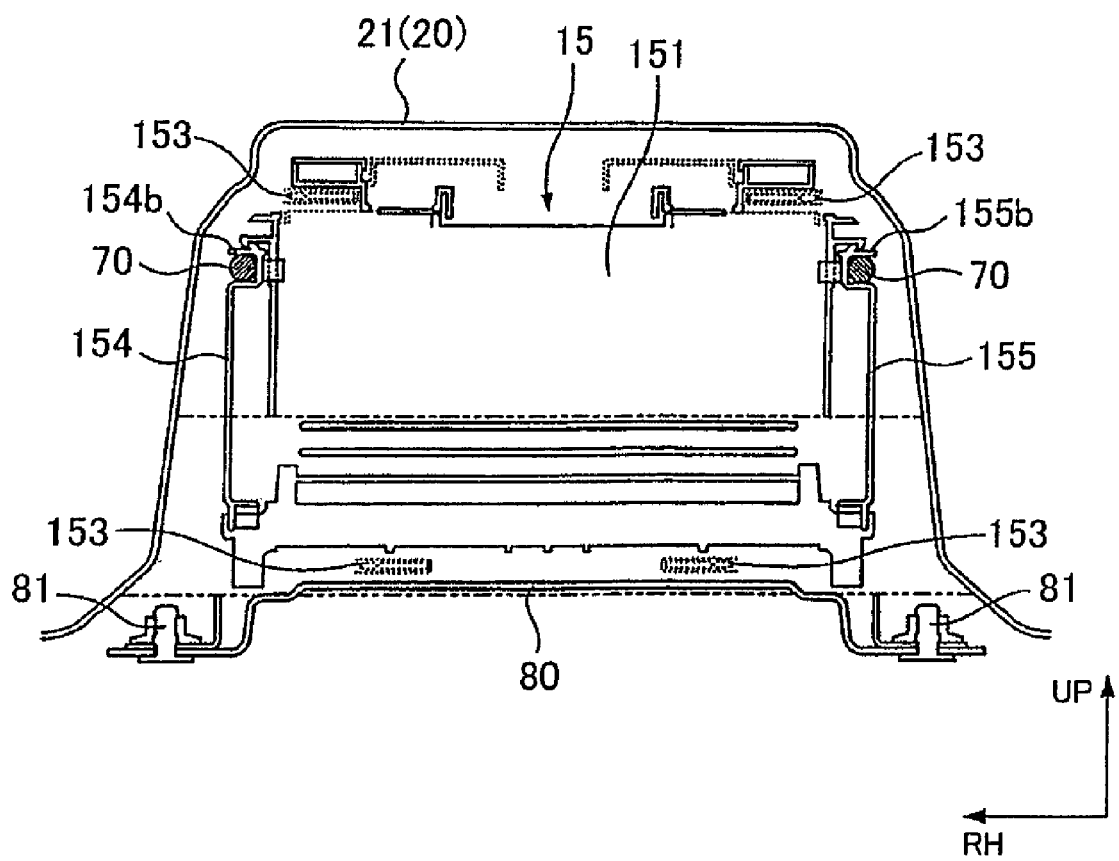
FIG. 13 is a sectional view of an upper battery stack.

As shown in FIG. 13, the intake chamber 154 has a holding portion 154*b* that holds a wire harness 70. The holding portion 154*b* is provided above the intake chamber 154 and is concave toward the unit cells 151. The wire harness 70 is accommodated in the holding portion 154*b* and does not protrude from the intake chamber 154. There are provided a plurality of the holding portions 154*b* and the plurality of holding portions 154*b* are arranged at intervals in the longitudinal direction of the intake chamber 154 (longitudinal direction of the vehicle 100).

The exhaust chamber 155 has a holding portion 155*b* that holds the wire harness 70. The holding portion 155*b* is provided above the exhaust chamber 155 and is concave toward the unit cells 151. The wire harness 70 is accommodated in the holding portion 155*b* and does not protrude from the exhaust chamber 155. There are provided a plurality of the holding portions 155*b* and the plurality of holding portions 155*b* are arranged at intervals in the longitudinal direction of the exhaust chamber 155 (longitudinal direction of the vehicle 100).

With the use of the holding portions 154*b* and 155*b*, the wire harness 70 is fixed to the battery stack 15. By fixing the wire harness 70 to the battery stack 15, it is made easy to handle the wire harness 70 and the battery stack 15, so that it is made easy to assemble the battery unit 1. In addition, by accommodating the wire harness 70 in the holding portions 154*b* and 155*b*, it is possible to prevent the increase in size of the battery unit 1 in the lateral direction in FIG. 13.

Although the holding portions 154*b* and 155*b* are provided at the intake chamber 154 and the exhaust chamber 155 of the battery stack 15 in this embodiment, the invention is not limited to this. Portions corresponding to the holding portions 154*b* and 155*b* may be provided at the intake chambers and the exhaust chambers of the battery stacks 11 to 14. The portions corresponding to the holding portions 154*b* and 155*b* may be provided at one of the intake chamber and the exhaust chamber.

A bracket 157 extends in the direction of alignment of the plurality of unit cells 151 and is fixed to the exhaust chamber 155. The stud bolts 81 of the base 80 are passed through the bracket 157 and engage with the nuts 159b. Although not shown in FIG. 12, the bracket 157 is fixed also to the intake chamber 154. The battery stack 15 is fixed to the base 80 with the use of three types, of brackets 156 to 158. The bus bar module is placed on the upper side of the battery stack 15 as described with reference to FIG. 6.

The battery stacks 12 to 14 are pressed against the lower case 22 by the brackets 30. The shapes of the brackets 30 for the battery stacks 12 to 14 differ from each other. The five battery stacks 11 to 15 are electrically connected via the wire harness 70. An opening 22c is formed in a side wall of the lower case 22 to pass the cable for connecting between the battery stacks 11 to 15 and the load through the opening 22c.

A circuit breaker 71 is disposed near one of two battery monitoring units 40. The circuit breaker 71 is used to break the line of the battery stacks 11 to 15. The circuit breaker 71 includes a plug and a socket, into which the plug is inserted, and it is possible to break the line by removing the plug from the socket.

The circuit breaker 71 is passed through the opening 20c (see FIG. 2) of the pack case 20 and is passed through the opening formed in the floor panel 101. Thus, the circuit breaker 71 protrudes into the cabin and an operator can operate the circuit breaker 71 in the cabin. The circuit breaker 71 may be positioned in the space created under a seat cushion. In addition, a seal member may be used to secure the hermeticity between the opening 20c of the pack case 20 and the floor panel 101.

Figure 14:
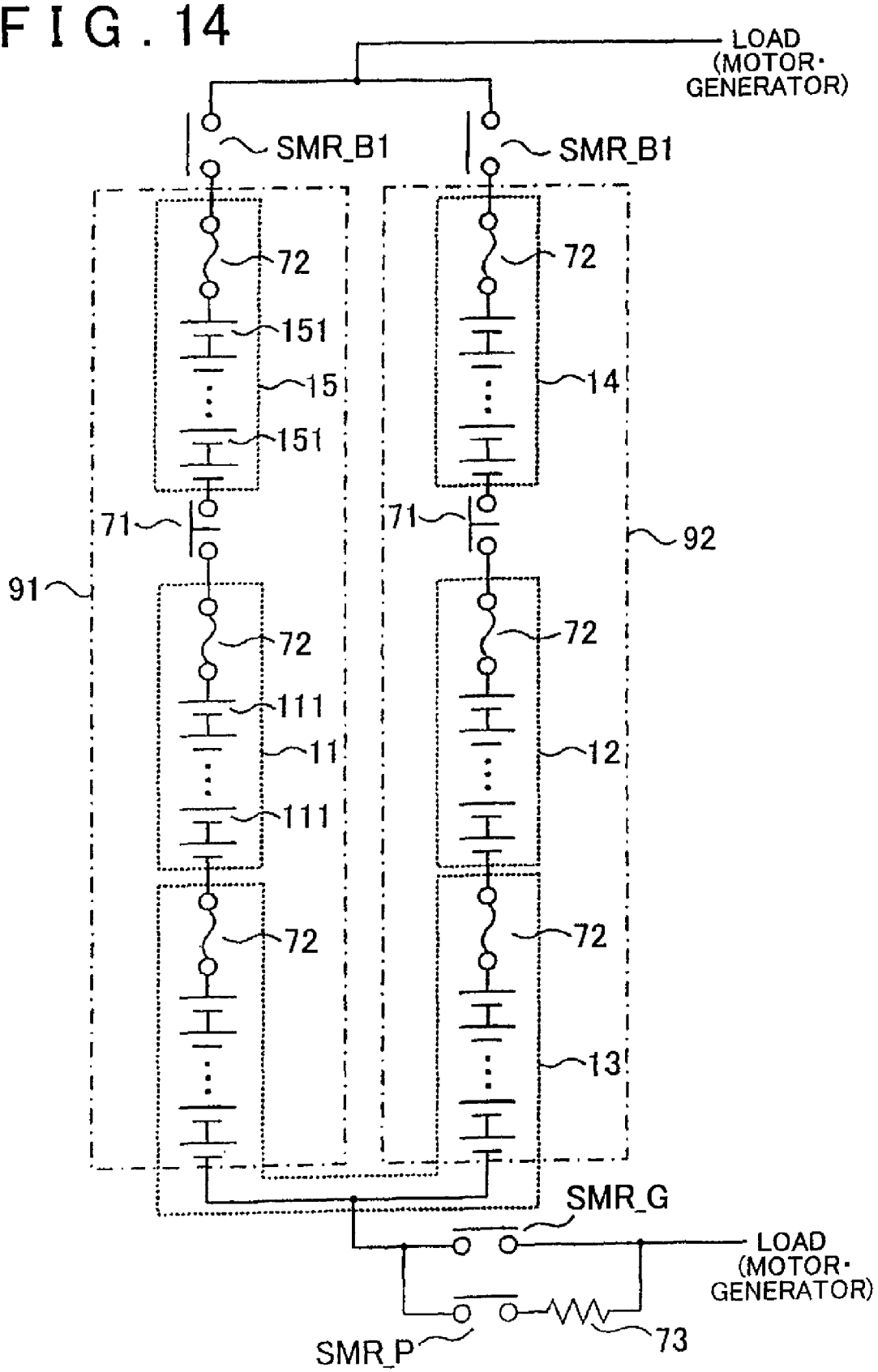
FIG. 14 is a diagram showing a circuit configuration of the battery unit.

Next, the circuit configuration of the battery unit 1 will be described with reference to FIG. 14.

In this embodiment, two battery packs 91 and 92 are formed by the five battery stacks 11 to 15 and are electrically connected in parallel. The number of unit cells constituting the battery pack 91 and the number of unit cells constituting the battery pack 92 are equal to each other. The battery packs 91 and 92 are connected to the load. Examples of the load include a motor generator, a step-up circuit, and an inverter.

One of the two battery monitoring units 40 shown in FIG. 12 is used to monitor the state of the battery pack 91 and the other battery monitoring unit 40 is used to monitor the state of the battery pack 92. The parameters of the state of the battery packs 91 and 92 include electric currents, voltages, and temperatures. The voltages include the voltage of each of the battery packs 91 and 92, the voltage of each unit cell, the voltages of a plurality of blocks, into which the plurality of unit cells constituting the battery packs 91 and 92 are divided. Each block includes two or more unit cells. The temperatures include those obtained by measuring one or more points of each of the battery packs 91 and 92.

The electric currents, the voltages, and the temperatures monitored by the battery monitoring units 40 are used to control the charging and discharging of the battery stacks 11 to 15. The electric currents, for example, are used to estimate the state of charge (SOC) of the battery stacks 11 to 15 and to estimate the deterioration conditions of the battery stacks 11 to 15. The voltages, for example, are used to prevent the overcharge and the overdischarge of the battery stacks 11 to 15.

The battery pack 91 is constituted of the two battery stacks 11 and 15 and part of the battery stack 13, in which the unit cells of the battery stacks 11, 15, and 13 are electrically connected in series. The battery pack 92 is constituted of the two battery stacks 12 and 14 and part of the battery stack 13, in which the unit cells of the battery stacks 12, 14, and 13 are electrically connected in series.

Each of the battery stacks 11 to 15 has a fuse 72. The circuit breaker 71 is provided between the battery stacks 11 and 15 and the circuit breaker 71 is also provided between the battery stacks 12 and 14. The two circuit breakers 71 are integrated into one unit, so that it is possible to simultaneously break the lines of both of the battery packs 91 and 92 by removing the plug of the circuit breaker 71.

A system main relay SMR_B1 is connected to a positive terminal of the battery pack 91 and a system main relay SMR_B2 is connected to a positive terminal of the battery pack 92. A system main relay SMR_G is connected to negative terminals of the battery packs 91 and 92. A system main relay SMR_P and a resistor 73 are connected in parallel with the system main relay SMR_G. The system main relays SMR_B1, B2, G, and P are included in the electronic equipment 60.

In order to electrically connect the battery packs 91 and 92 and the load, first, the system main relays SMR_B1 and B2, and the system main relay SMR_P are switched from off to on. Next, after switching the system main relay SMR_G from off to on, the system main relay SMR_P is switched from on to off. In this way, it is possible to charge and discharge the battery packs 91 and 92. By connecting the battery packs 91 and 92 to a DC power source or an AC power source, it is made possible to charge the battery packs 91 and 92.

Figure 15:
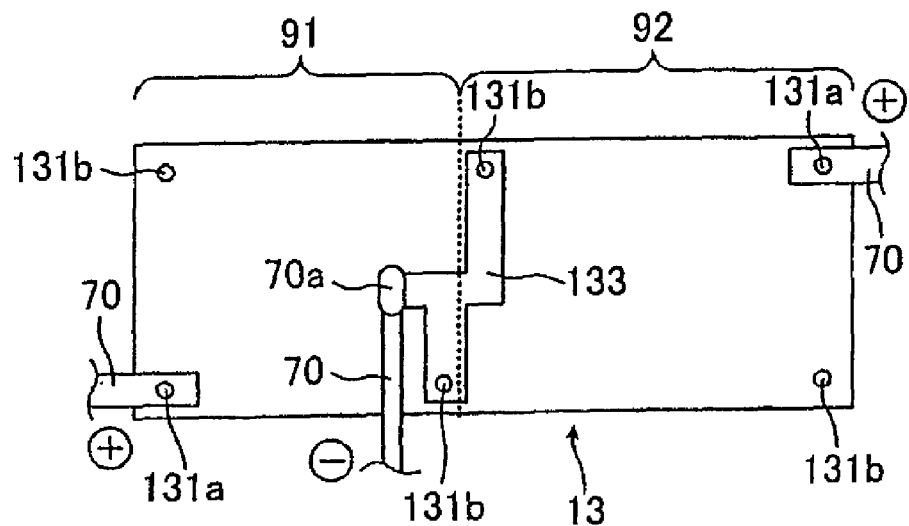
FIG. 15 is a schematic diagram showing a configuration of the battery stack, in which unit cells are connected in parallel.
Figure 16:
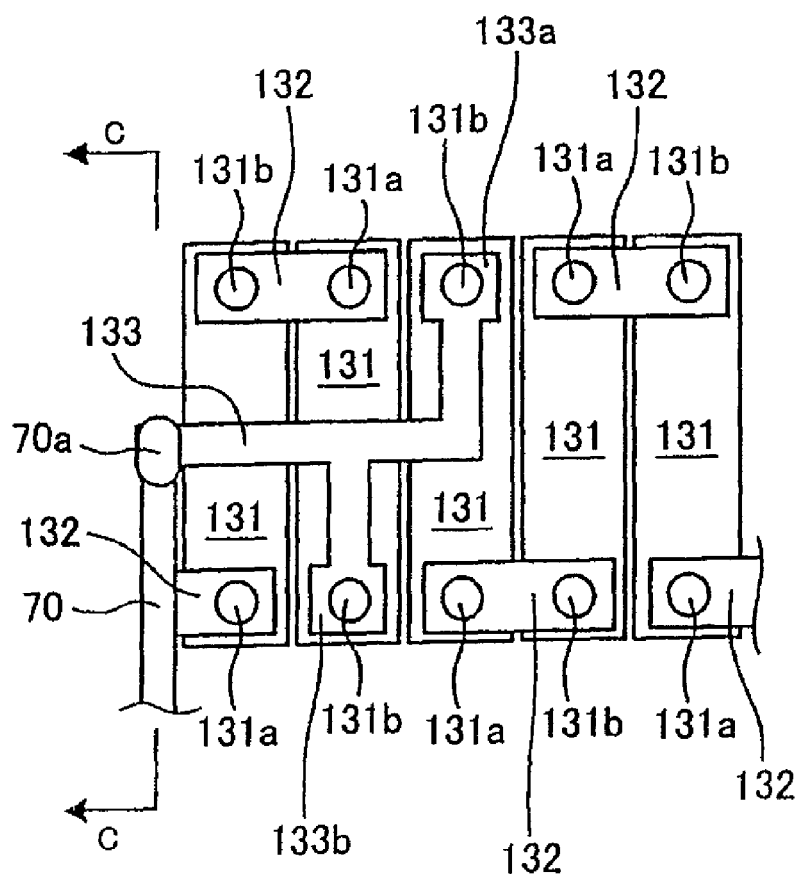
FIG. 16 is a plan view showing part of the battery stack including the unit cells that are connected in parallel.

In this embodiment, two unit cells included in the battery stack 13 are electrically connected in parallel. Such a configuration will be described with reference to FIGS. 15 and 16. FIG. 15 is a schematic diagram showing a configuration of the battery stack 13 and FIG. 16 is a diagram showing a connection configuration of bus bars in the battery stack 13. In FIG. 15, the illustration of the unit cells of the battery stack 13 is omitted.

In FIG. 15, at the two unit cells that are positioned at two ends of the battery stack 13, the wire harness 70 is connected to each of cathode terminals 131a. As described with reference to FIG. 14, one of the two wire harnesses 70 is connected to the anode terminal of the unit cell that is positioned at one end of the battery stack 12. The other wire harness 70 is connected to the anode terminal of the unit cell 111 that is positioned at one end of the battery stack 11.

Two types of bus bars 132 and 133 are used in the battery stack 13. In this embodiment, the bus bars 132 and 133 are held by a holder formed of an electrically insulating material, such as a resin, to form a bus bar module. As shown FIG. 16, the first bus bar 132 is connected to the cathode terminal 131a of one unit cell 131 and an anode terminal 131b of the other unit cell 131. A bus bar similar to the first bus bar 132 is used also in the battery stacks 11, 12, 14, and 15.

The second bus bar 133 has two connection portions 133a and 133b and is connected to the two anode terminals 131b. Specifically, the connection portion 133a is connected to the anode terminal 131b of one of the two unit cells 131 that are adjacent to each other. The connection portion 133b is connected to the anode terminal 131b of the other unit cell 131. A terminal 70a of the wire harness 70 is connected to the second bus bar 133.

Figure 17:
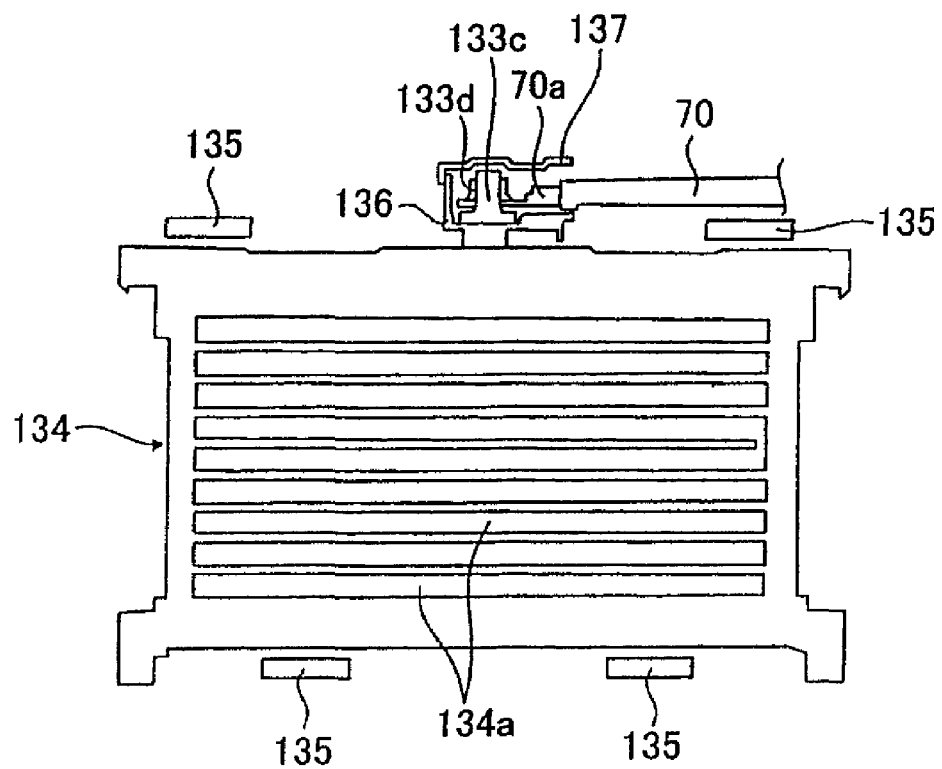
FIG. 17 is a diagram showing a connection configuration of a bus bar and a wire harness used for parallel connection.

As shown in FIG. 17, the second bus bar 133 has a bolt 133c. FIG. 17 is a cross-sectional view taken along the line C-C in FIG. 16. The bolt 133c engages with a nut 133d, penetrating the terminal 70a of the wire harness 70. In this way, the terminal 70a is fixed to the second bus bar 133. The holder 136 holds the second bus bar 133 and is formed of an electrically insulating material. The bolt 133c and the terminal 70a are covered by a cover 137 and the cover 137 is attached to a holder 136.

A separator plate 134 is positioned under the bolt 133c. When an external force is applied downward during the operation of connecting a bolt 133c and a terminal 70a, the lower surface of the holder 136 contacts the upper surface of the separator plate 134. Thus, it is possible to prevent the load caused by the operation of connecting the bolt 133c and the terminal 70a from being applied to the unit cells 131.

The separator plate 134 is placed between two adjacent unit cells 131 to create a space on each of the surfaces of the unit cells 131. Through this space, air for regulating the temperature of the unit cells 131 moves as described later. The separator plate 134 has a plurality of protrusions 134a, the tips of which contact the unit cells 131, so that the space is created on each of the surfaces of the unit cells 131.

In this embodiment, the protrusions 134a extend in the lateral direction in FIG. 17 and the plurality of protrusions 134a are arranged in the vertical direction in FIG. 17. The shape of the protrusion 134a is not limited to the shape shown in FIG. 17. Specifically, it suffices that a space, through which air moves, is created on each of the surfaces of the unit cells 131. Meanwhile, restraining bands 135 to exert a restraining force to the unit cells 131 are placed above and below the separator plate 134.

With the use of the second bus bar 133, it is possible to electrically connect two adjacent unit cells 131 in parallel. In this way, it is possible to divide the plurality of unit cells 131 constituting the battery stack 13 into the two battery packs 91 and 92 that are connected in parallel. In addition, because the positions, at which the second bus bar 133 is connected, can be changed as desired, it is possible to select the two unit cells 131 that are electrically connected in parallel.

Although the second bus bar 133 is connected to two anode terminals 131b in this embodiment, the second bus bar 133 may be connected to two cathode terminals 131a. In this case, the cathodes and the anodes of the battery packs 91 and 92 shown in FIG. 14 are inverted. The shape of the second bus bar 133 is not limited to the shape shown in FIGS. 15 and 16. Specifically, it suffices that the second bus bar 133 is connected to the same polarity terminals and are connected to the wire harness 70.

Next, the flow of air that is supplied to the battery unit 1 will be described with reference to FIGS. 18 to 20.

Figure 18:
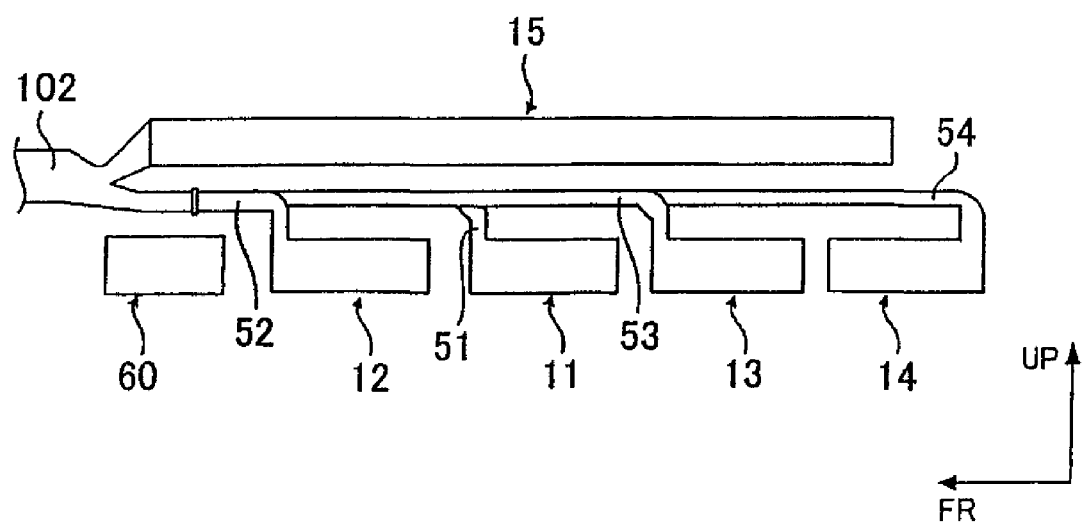
FIG. 18 is a side view showing an internal structure of the battery unit.

As shown in FIG. 18, the air from the intake duct 102 is introduced into the battery stack 15 and is introduced into the battery stacks 11 to 14 through the branch ducts 51 to 54. When air moves into the battery stack 15, as shown by the arrows in FIG. 19, the air moves along the intake chamber 154 and enters the space created between two adjacent unit cells 151. Heat is exchanged between the air and the unit cells 151, so that the temperature of the unit cells 151 is regulated.

The air introduced into the battery stack 15 moves from the intake chamber 154 toward the exhaust chamber 155. The air after heat exchange moves into the exhaust chamber 155 and is discharged through the exhaust port 155a of the exhaust chamber 155. The air discharged through the exhaust port 155a moves into the space (the space in which the battery stacks 11 to 15 are accommodated) surrounded by the upper case 21 and the lower case 22.

The air that passes through the branch duct 51 is introduced into the battery stack 11. The air introduced into the battery stack 11 moves along the intake chamber 114. The air moves toward the two ends of the battery stack 11. The air moves along the direction of alignment of the battery stack 11 and enters the space created between two adjacent unit cells 111. Heat is exchanged between air and the unit cells 111, so that the temperature of the unit cells 111 is regulated. The air after heat exchange moves into the exhaust chamber 115 and is discharged through the exhaust ports 115a that are provided at the two ends of the battery stack 11. The air discharged through the exhaust ports 115a moves into the space surrounded by the upper case 21 and the lower case 22.

The air introduced from the branch duct 52 into the battery stack 12 moves toward the two ends of the battery stack 12 in the intake chamber and moves into the space created between two adjacent unit cells. The air after the heat exchange with the unit cells moves into the exhaust chamber and is discharged through the exhaust ports provided at the two ends of the battery stack 12. The air discharged through the exhaust ports of the battery stack 12 moves into the space surrounded by the upper case 21 and the lower case 22.

The air introduced from the branch duct 53 into the battery stack 13 moves toward the two ends of the battery stack 13 in the intake chamber and moves into the space created between two adjacent unit cells. The air after the heat exchange with the unit cells moves into the exhaust chamber and is discharged through the exhaust ports provided at the two ends of the battery stack 13. The air discharged through the exhaust ports of the battery stack 13 moves into the space surrounded by the upper case 21 and the lower case 22.

The air introduced from the branch duct 54 into the battery stack 14 moves toward the two ends of the battery stack 14 in the intake chamber and moves into the space created between two adjacent unit cells. The air after the heat exchange with the unit cells moves into the exhaust chamber and is discharged through the exhaust ports provided at the two ends of the battery stack 14. The air discharged through the exhaust ports of the battery stack 14 moves into the space surrounded by the upper case 21 and the lower case 22.

The exhaust chamber of the battery stack 13 and the exhaust chamber of the battery stack 14 face each other in the longitudinal direction of the vehicle 100. The battery stacks 13 and 14 are close to each other in the longitudinal direction of the vehicle 100. The interval between the battery stacks 13 and 14 is smaller than both of the interval between the battery stacks 11 and 12 and the interval between the battery stacks 11 and 13. When the battery stacks 13 and 14 are arranged close to each other in this way, there is a possibility that the waste heat of the battery stack 13 reaches the unit cells of the battery stack 14.

In this embodiment, the exhaust chambers of the battery stacks 13 and 14 face each other, so that the heat from the exhaust chamber of the battery stack 13 merely reaches the exhaust chamber of the battery stack 14; for example. Even when the heat from the battery stack 13 reaches the exhaust chamber of the battery stack 14, the heat is merely discharged through the exhaust chamber of the battery stack 14. Thus, it is possible to prevent the heat from the battery stack 13 from reaching the unit cells of the battery stack 14.

The air in the pack case 20 (air after heat exchange) is introduced into the exhaust duct 106 and moves to the outside of the pack case 20. The air that enters the exhaust duct 106 moves along the exhaust duct 106 and is discharged into the outside of the vehicle 100 through the exhaust port 106b (see FIG. 1).

Figure 19:
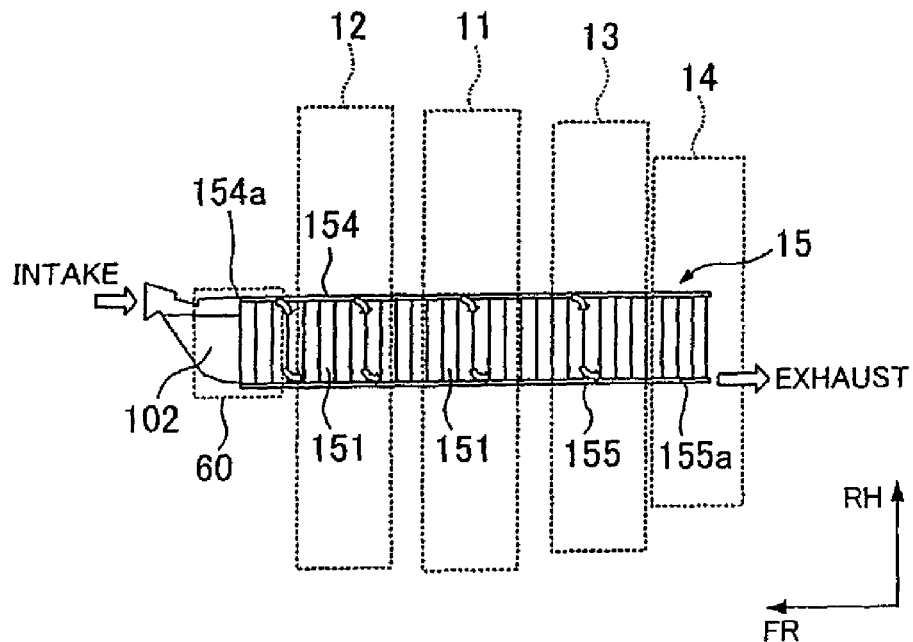
FIG. 19 is a diagram for explaining the flow path of the air in the battery stack.
Figure 20:
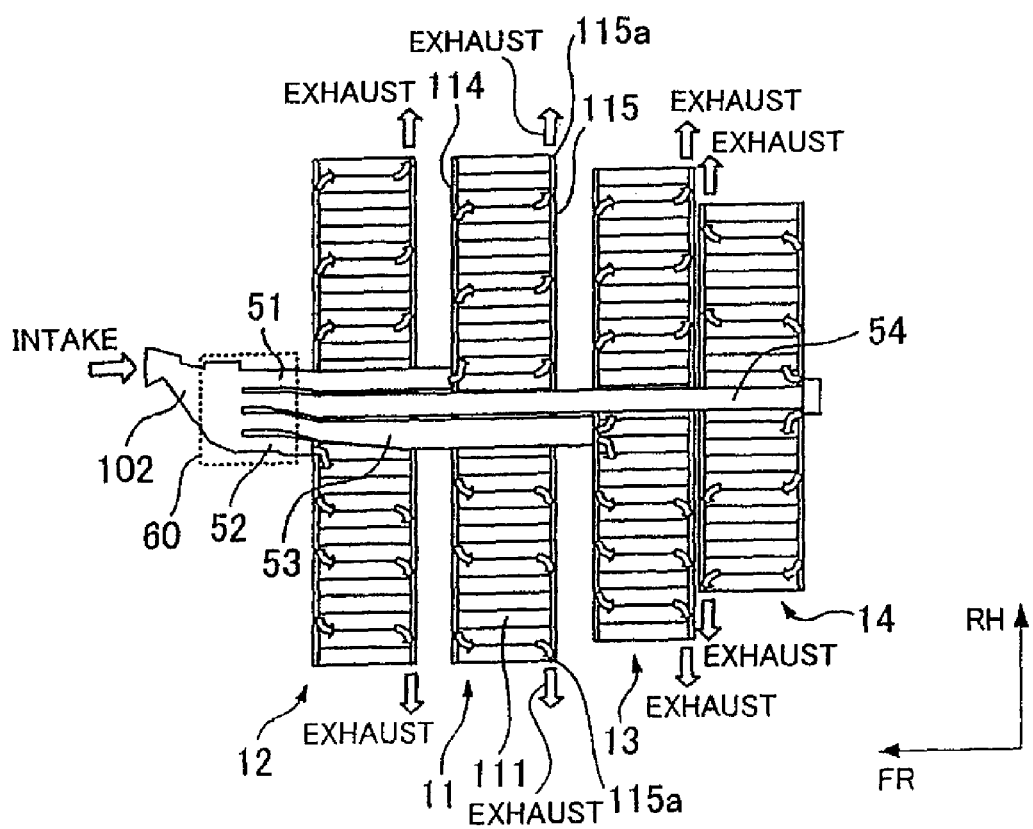
FIG. 20 is a diagram for explaining the flow path of the air in the battery stack.

As shown in FIGS. 18 to 20, the electronic equipment 60 is placed under the battery stack 15 and therefore, the battery stack 15 is positioned where the heat generated by the electronic equipment 60 tends to rise and reach. In this embodiment, however, the joint between the battery stack 15 and the intake duct 102 is positioned over the electronic equipment 60. In addition, the electronic equipment 60 faces all of the branch ducts 51 to 54 along the vertical direction. Thus, air from the intake duct 102 first reaches the part of the battery stack 15 that tends to be reached by the heat of the electronic equipment 60. Thus, it is possible to avoid that only a part of the battery stack 15 is heated by the heat of the electronic equipment 60. Thus, it is possible to suppress the nonuniformity of temperature in the unit cells 151 in the direction of alignment of the plurality of unit cells 151.

In addition, in this embodiment, as shown in FIG. 19, the battery stack 15 and the battery stacks 11 to 14 are arranged so that the former intersects the latter when viewed from above. In the case of such a configuration, the heat generated by the battery stacks 11 to 14 can rise toward the battery stack 15. For example, the heat generated by the battery stack 11 rises toward part of the unit cells 151 included in the battery stack 15. When heat is applied to part of the unit cells 151 only, the nonuniformity of temperature in the unit cells 151 in the direction of alignment of the battery stack 15 occurs.

In this embodiment, the branch ducts 51, 53, and 54 are placed between the battery stack 15 and the battery stacks 11 to 14. Specifically, the branch ducts 53 and 54 that are connected to the battery stacks 13 and 14 are positioned over the battery stack 11. The branch ducts 51, 53, and 54 that are connected to the battery stacks 11, 13, and 14 are positioned over the battery stack 12. The branch duct 54 that is connected to the battery stack 14 is positioned over the battery stack 13. The branch duct 54 that is connected to the battery stack 14 is positioned over the battery stack 14.

The heat generated by the battery stacks 11 to 14 is prevented from reaching the battery stack 15 by the branch ducts 51, 53, and 54 that are arranged in this way. In addition, cooling air flows through the branch ducts 51, 53, and 54, so that heat does not remain in the branch ducts 51, 53, and 54 even when the heat of the battery stacks 11 to 14 reaches the branch ducts 51, 53, and 54.

As described above, this embodiment prevents the heat of the battery stacks 11 to 14 from partially heating the battery stack 15 and suppress the nonuniformity of temperature in the unit cells 151 in the direction of alignment of the battery stack 15. Suppressing the nonuniformity of temperature in the unit cells 151 makes it possible to suppress variations in degradation of the unit cells 151 caused by temperature. Thus, it is possible to equalize the lifes of all the unit cells 151 in the battery stack 15 and it is possible to use all the unit cells 151 until the lifetime expires.

In this embodiment, when the battery unit 1 is viewed from above, the branch ducts 51 to 54 are positioned within the region occupied by the battery stack 15. Specifically, the branch ducts 51 to 54 do not extend out of the battery stack 15 when viewed from above. Thus, the branch ducts 51 to 54 are efficiently disposed in the space created between the battery stack 15 and the battery stacks 11 to 14, so that it is possible to suppress the increase in size of the battery unit 1.

By placing the battery stack 15 in the center tunnel 101a as in this embodiment, it is made possible to use a larger number of battery stacks 11 to 15 to form the battery unit 1. Since the center tunnel 101a is positioned between the driver's seat and the passenger seat, no adverse effect is caused in terms of the comfort in the cabin even when the center tunnel 101a is provided.

In addition, it is possible to arrange the battery unit 1 along the floor panel 101 by placing the battery stack 15 in the center tunnel 101a and placing the electronic equipment 60 and the battery stacks 11 to 14 in one plane. In other words, the battery unit 1 is efficiently disposed along the outer surface of the vehicle 100 and it is made possible to suppress the increase in size of the battery unit 1 in the vertical direction of the vehicle 100.

Although one battery stack 15 is placed in the center tunnel 101a of the floor panel 101 in this embodiment, the invention is not limited to this. For example, a plurality of battery stacks may be placed in the center tunnel 101a. The plurality of battery stacks placed in the center tunnel 101a may be aligned either in the longitudinal direction of the vehicle 100 or in the lateral direction of the vehicle 100. It is not necessary that the entire battery stack 15 is placed in the center tunnel 101a. Part of the battery stack 15 may be placed in the center tunnel 101a.

Although, in this embodiment, as described with reference to FIG. 14, two battery packs 91 and 92 are electrically connected in parallel, the invention is not limited to this. For example, the battery packs 91 and 92 may be connected in series. Alternatively, a configuration may be employed, in which three or more battery packs are formed with the use of the battery stacks 11 to 15 and these battery packs are electrically connected in parallel. Meanwhile, although the air present outside the vehicle 100 is supplied to the battery unit 1 in this embodiment, the air in the cabin may be supplied to the battery unit 1. Instead of air, another coolant (gas) may be used.

Although the battery stacks 11 to 14 and the electronic equipment 60 are placed under the battery stack 15 in this embodiment, the invention is not limited to this. For example, what is placed under the battery stack 15 may be the electronic equipment 60 only. The battery stack 15 includes the plurality of unit cells 151 etc. and is therefore larger than the electronic equipment 60. Thus, it is possible to efficiently arrange the battery stack 15 and the electronic equipment 60 relative to the floor panel 101 by placing the battery stack 15 along the floor panel 101 and placing the electronic equipment 60 under the battery stack 15. When the electronic equipment 60 is placed above the battery stack 15, it is likely that a dead space occurs between the battery stack 15 and the electronic equipment 60. By disposing the electronic equipment 60 under the battery stack 15 as in this embodiment, it is possible to suppress the occurrence of the dead space.

Although the four battery stacks 11 to 14 are disposed under the battery stack 15 in this embodiment, the invention is not limited to this. Specifically, the number of battery stacks that are disposed under the battery stack 15 may be one or greater. Although the battery stack 15 and the battery stacks 11 to 14 are disposed so as to be perpendicular to each other when viewed from above (see FIG. 19) in this embodiment, the invention is not limited to this. It suffices that the battery stack 15 and the battery stacks 11 to 14 are disposed so as to intersect each other.

The invention has been described with reference to example embodiments for illustrative purposes only. It should be understood that the description is not intended to be exhaustive or to limit form of the invention and that the invention may be adapted for use in other systems and applications. The scope of the invention embraces various modifications and equivalent arrangements that may be conceived by one skilled in the art.

The invention claimed is:
1. An electricity storage device comprising:
a first battery stack including a plurality of cells that are aligned in a first direction;

a plurality of second battery stacks each including a plurality of cells that are aligned in a second direction different from the first direction, the second battery stacks being spaced apart in intervals so as to have gaps between adjacent second battery stacks, the second battery stacks being placed under the first battery stack; and a duct for coolant, wherein the duct is disposed along the first direction of the first battery stack and is positioned between the first battery stack and the second battery stacks, so as to be disposed over portions of the second battery stacks that intersect the first battery stack.

2. The electricity storage device according to claim 1, wherein the duct is connected to each of the second battery stacks and supplies coolant to the second battery stacks.

3. The electricity storage device according to claim 2, wherein the ducts connected to the second battery stacks are joined together on an upstream side in terms of a flow path of the coolant.

4. The electricity storage device according to claim 2, further comprising electronic equipment that is used to control charging and discharging of the electricity storage device, the electronic equipment being placed under the plurality of ducts at a position such that the electronic equipment faces the plurality of ducts.

5. The electricity storage device according to claim 1, wherein the first direction and the second direction are perpendicular to each other.

6. A vehicle comprising:

the electricity storage device according to claim 1; and a motor/generator that receives electric power from the electricity storage device to generate kinetic energy for driving the vehicle.

\* \* \* \* \*